(12) United States Patent
Nevitt et al.

(10) Patent No.: US 10,948,644 B2
(45) Date of Patent: Mar. 16, 2021

(54) OPTICAL FILM HAVING THIRD OR HIGHER ORDER VISIBLE REFLECTION BANDS

(71) Applicant: 3M INNOVATIVE PROPERTIES COMPANY, St. Paul, MN (US)

(72) Inventors: Timothy J. Nevitt, Red Wing, MN (US); Edward J. Kivel, Stillwater, MN (US); William B. Black, Eagan, MN (US)

(73) Assignee: 3M INNOVATIVE PROPERTIES COMPANY, St. Paul, MN (US)

( * ) Notice: Subject to any disclaimer, the term of this patent is extended or adjusted under 35 U.S.C. 154(b) by 215 days.

(21) Appl. No.: 16/305,475

(22) PCT Filed: Jul. 13, 2017

(86) PCT No.: PCT/US2017/041891
§ 371 (c)(1),
(2) Date: Nov. 29, 2018

(87) PCT Pub. No.: WO2018/013784
PCT Pub. Date: Jan. 18, 2018

(65) Prior Publication Data
US 2020/0326461 A1    Oct. 15, 2020

Related U.S. Application Data

(60) Provisional application No. 62/361,618, filed on Jul. 13, 2016.

(51) Int. Cl.
*G02B 5/30* (2006.01)
*G02B 1/04* (2006.01)
(Continued)

(52) U.S. Cl.
CPC .............. *G02B 5/305* (2013.01); *G02B 1/04* (2013.01); *G02B 5/26* (2013.01);
(Continued)

(58) Field of Classification Search
CPC ... G02B 5/03; G02B 1/04; G02B 5/26; G02B 5/287; G02B 5/28; G02B 5/281;
(Continued)

(56) References Cited

U.S. PATENT DOCUMENTS

| 3,610,729 A | 10/1971 | Rogers |
| 4,446,305 A | 5/1984 | Rogers |

(Continued)

FOREIGN PATENT DOCUMENTS

| CN | 101493541 | 7/2009 |
| CN | 101842422 | 9/2010 |

(Continued)

OTHER PUBLICATIONS

International Search Report for PCT International Application No. PCT/US2017/041891, dated Oct. 20, 2017, 8 pages.
(Continued)

*Primary Examiner* — Arnel C Lavarias
(74) *Attorney, Agent, or Firm* — Clifton F. Richardson

(57) ABSTRACT

An optical film including alternating polymeric layers and having distinct first, second and third reflection bands is described. The first, second and third reflection bands are each visible reflection bands at normal incidence for at least one polarization state. At least two of the first, second and third reflection bands are third order or higher order harmonics.

25 Claims, 17 Drawing Sheets

(51) Int. Cl.
*G02B 5/26* (2006.01)
*G02F 1/1335* (2006.01)
*G02F 1/1337* (2006.01)
*G02B 5/28* (2006.01)

(52) U.S. Cl.
CPC .. *G02F 1/133536* (2013.01); *G02F 1/133711* (2013.01); *G02B 5/287* (2013.01)

(58) Field of Classification Search
CPC ........ G02B 5/285; G02B 5/30; G02B 5/3025; G02B 5/3033; G02B 5/3041; G02F 1/133536; G02F 1/133711
USPC ............ 359/485.03, 483.01, 485.01, 489.01, 359/489.08, 489.11, 489.15, 577, 580, 359/581, 584, 586, 588, 589, 590
See application file for complete search history.

(56) References Cited

U.S. PATENT DOCUMENTS

| | | | |
|---|---|---|---|
| 5,486,949 A | 1/1996 | Schrenk | |
| 5,882,774 A | 3/1999 | Jonza | |
| 6,049,419 A | 4/2000 | Wheatley | |
| 6,157,490 A | 12/2000 | Wheatley | |
| 6,179,948 B1 | 1/2001 | Merrill | |
| 6,531,230 B1 | 3/2003 | Weber | |
| 6,667,095 B2 | 12/2003 | Wheatley | |
| 6,783,349 B2 | 8/2004 | Neavin | |
| 7,019,905 B2 * | 3/2006 | Weber | G02B 5/285 359/359 |
| 7,138,173 B2 | 11/2006 | Wheatley | |
| 2005/0079333 A1 | 4/2005 | Wheatley | |
| 2007/0097509 A1 | 5/2007 | Nevitt | |
| 2009/0323180 A1 | 12/2009 | Weber | |
| 2010/0202049 A1 | 8/2010 | Kang et al. | |
| 2011/0272849 A1 | 11/2011 | Neavin | |
| 2012/0287117 A1 | 11/2012 | Weber | |
| 2013/0215512 A1 | 8/2013 | Coggio | |
| 2014/0313572 A1 | 10/2014 | Kivel | |
| 2015/0146166 A1 | 5/2015 | Weber et al. | |

FOREIGN PATENT DOCUMENTS

| | | |
|---|---|---|
| JP | 2002509281 | 3/2002 |
| WO | WO 2013-059226 | 4/2013 |
| WO | WO 2016-061192 | 4/2016 |

OTHER PUBLICATIONS

Nevitt, "Recent advances in multilayer polymeric interference reflector products", Thin Solid Films, vol. 532, Apr. 1, 2013, pp. 106-112, XP055576474.

* cited by examiner

OPTICAL FILM HAVING THIRD OR HIGHER ORDER VISIBLE REFLECTION BANDS

BACKGROUND

Multilayer optical films are known. Such films can incorporate a large number of thin layers of different light transmissive materials, the layers being referred to as microlayers because they are thin enough so that the reflection and transmission characteristics of the optical film are determined in large part by constructive and destructive interference of light reflected from the layer interfaces. Depending on the amount of birefringence (if any) exhibited by the individual microlayers, and the relative refractive index differences for adjacent microlayers, and also on other design characteristics, the multilayer optical films can be made to have reflection and transmission properties that may be characterized as a reflective polarizer in some cases, and as a mirror in other cases, for example.

Reflective polarizers composed of a plurality of microlayers whose in-plane refractive indices are selected to provide a substantial refractive index mismatch between adjacent microlayers along an in-plane block axis and a substantial refractive index match between adjacent microlayers along an in-plane pass axis, with a sufficient number of layers to ensure high reflectivity for normally incident light polarized along one principal direction, referred to as the block axis, while maintaining low reflectivity and high transmission for normally incident light polarized along an orthogonal principal direction, referred to as the pass axis, are known. See, e.g., U.S. Pat. No. 3,610,729 (Rogers), U.S. Pat. No. 4,446,305 (Rogers et al.), and U.S. Pat. No. 5,486,949 (Schrenk et al.).

SUMMARY

In some aspects of the present description, an optical film including alternating polymeric layers and having distinct first, second and third reflection bands is provided. The first, second and third reflection bands are each visible reflection bands at normal incidence for at least one polarization state. At least two of the first, second and third reflection bands are third order or higher order harmonics.

DETAILED DESCRIPTION

Figure 1:
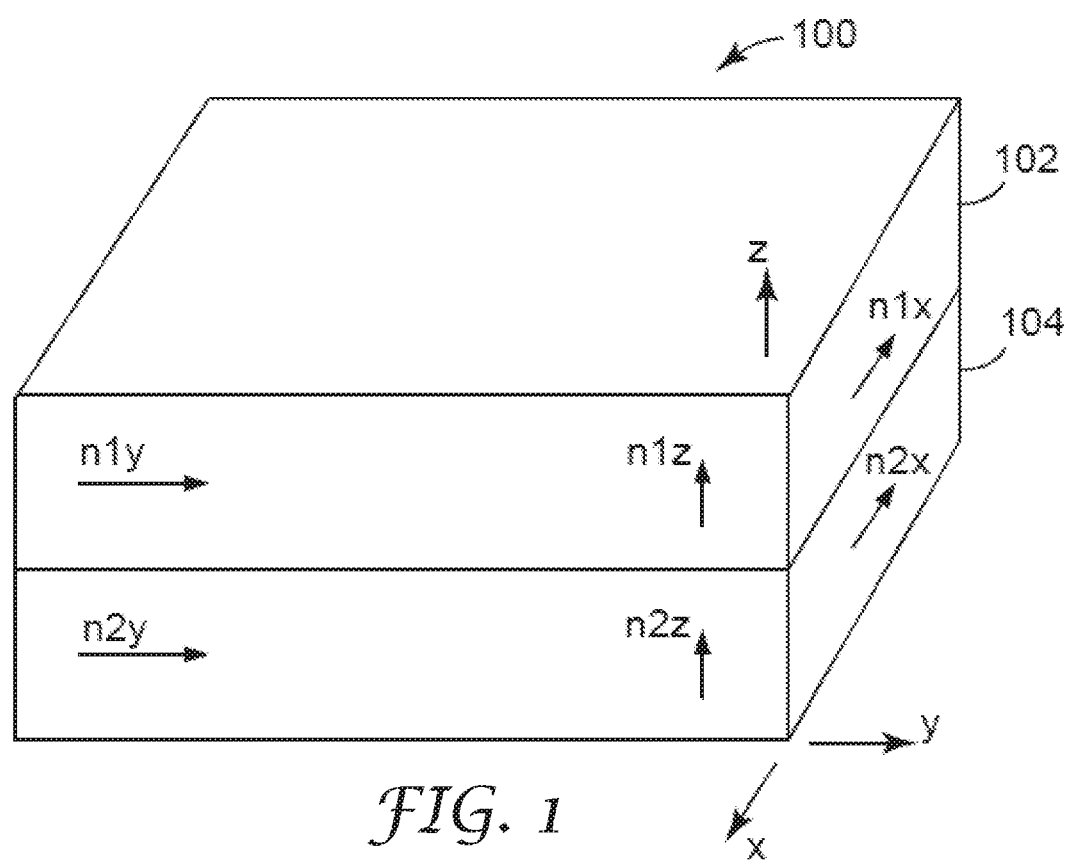
FIG. 1 is a schematic perspective view of an exemplary optical repeat unit (ORU) of a multilayer optical film.

In the following description, reference is made to the accompanying drawings that forms a part hereof and in which various embodiments are shown by way of illustration. The drawings are not necessarily to scale. It is to be understood that other embodiments are contemplated and may be made without departing from the scope or spirit of the present disclosure. The following detailed description, therefore, is not to be taken in a limiting sense.

A multilayer optical film can be used to provide multiple reflection bands in the visible spectrum. U.S. Pat. No. 7,138,173 (Wheatley et al.), which is hereby incorporate herein by reference to the extent that it does not contradict the present description, describes a multilayer optical film that includes a first stack of optical repeat units configured to produce a first order reflection band at a wavelength of 1300 nm so that the second and third order reflection bands are occur at approximately 650 nm and 450 nm, respectively.

The multilayer optical film includes a second stack of optical repeat units that produces a first order reflection peak at about 550 nm. By combining the two stacks of optical repeat units, three distinct visible light reflection bands were provided. Reflection bands of multilayer polymeric optical films adapted for use in display applications, for example, have generally utilized relatively low-order harmonic reflection bands because the reflective power of higher order reflection bands has been considered to be too low. According to the present description, it has been found that an optical film providing higher order reflection bands in the visible range is useful. For example, three visible reflection bands may be provided with two or three of the reflection bands being $3^{rd}$ order or higher order harmonics. This can be accomplished, for example, by using three distinct stacks of optical repeat units where at least two of the three stacks provide third or higher order reflection bands. This can also be accomplished, for example, by using a single stack of optical repeat units that provide $4^{th}$, $5^{th}$ and $6^{th}$ order or $5^{th}$, $6^{th}$ and $7^{th}$ order visible reflection bands. Such optical films can be configured to provide three reflection bands having narrow bandwidths with sharp band edges. Optical films having reflection bands that are third or higher order have been found to be particularly useful as a front reflector for a liquid crystal display (LCD) having a color filter. LCDs utilizing the optical films of the present description as a front reflector have a significantly improved color gamut compared to LCDs utilizing a conventional reflective polarizer.

As used herein, unless specified differently, blue light refers to light having wavelengths of at least 400 nm and less than 500 nm, green light refers to light having wavelengths in the range of 500 nm to 600 nm, red light refers to light having wavelengths greater than 600 nm and no more than 700 nm, and visible light refers to light having wavelengths in the range of 400 nm to 700 nm.

FIG. 1 is a schematic perspective view of an exemplary optical repeat unit (ORU) of a multilayer optical film 100. FIG. 1 depicts only two layers of the multilayer optical film 100, which can include tens or hundreds of such layers arranged in one or more contiguous packets or stacks. The film 100 includes individual microlayers 102, 104, where "microlayers" refer to layers that are sufficiently thin so that light reflected at a plurality of interfaces between such layers undergoes constructive or destructive interference to give the multilayer optical film the desired reflective or transmissive properties. The microlayers 102, 104 can together represent one optical repeat unit (ORU) of the multilayer stack, an ORU being the smallest set of layers that recur in a repeating pattern throughout the thickness of the stack. The microlayers have different refractive index characteristics so that some light is reflected at interfaces between adjacent microlayers. For optical films designed to reflect light at ultraviolet, visible, or near-infrared wavelengths, each microlayer typically has an optical thickness (i.e., a physical thickness multiplied by the relevant refractive index) of less than about 1 micrometer. Thicker layers can, however, also be included, such as skin layers at the outer surfaces of the film, or protective boundary layers (PBL) disposed within the film that separate packets of microlayers, as desired. In many embodiments, only a single packet or stack of microlayers is included in the optical films of the present description.

Refractive indices of one of the microlayers (e.g. layer 102 of FIG. 1, or the "A" layers of FIG. 2 below) for light polarized along principal x-, y-, and z-axes are n1x, n1y, and n1z, respectively. The mutually orthogonal x-, y-, and z-axes can, for example, correspond to the principal directions of the dielectric tensor of the material. In many embodiments, and for discussion purposes, the principle directions of the different materials are coincident, but this need not be the case in general. The refractive indices of the adjacent microlayer (e.g. layer 104 in FIG. 1, or the "B" layers in FIG. 2) along the same axes are n2x, n2y, n2z, respectively. The differences in refractive index between these layers are $\Delta nx$ (=n1x−n2x) along the x-direction, $\Delta ny$ (=n1y−n2y) along the y-direction, and $\Delta nz$ (=n1z−n2z) along the z-direction. The nature of these refractive index differences, in combination with the number of microlayers in the film (or in a given stack of the film) and their thickness distribution, control the reflective and transmissive characteristics of the film (or of the given stack of the film). For example, if adjacent microlayers have a large refractive index mismatch along one in-plane direction ($\Delta nx$ large) and a small refractive index mismatch along the orthogonal in-plane direction ($\Delta ny \approx 0$), the film or packet may behave as a reflective polarizer for normally incident light. A reflective polarizer may be considered to be an optical body that strongly reflects normally incident light that is polarized along one in-plane axis, referred to as the "block axis," if the wavelength is within the reflection band of the packet, and strongly transmits such light that is polarized along an orthogonal in-plane axis, referred to as the "pass axis."

If desired, the refractive index difference ($\Delta nz$) between adjacent microlayers for light polarized along the z-axis can also be tailored to achieve desirable reflectivity properties for the p-polarization component of obliquely incident light. To maintain near on-axis reflectivity of p-polarized light at oblique angles of incidence, the z-index mismatch $\Delta nz$ between microlayers can be controlled to be substantially less than the maximum in-plane refractive index difference $\Delta nx$, such that $\Delta nz \leq 0.5 * \Delta nx$. Alternatively, $\Delta nz \leq 0.25 * \Delta nx$. A zero or near zero magnitude z-index mismatch yields interfaces between microlayers whose reflectivity for p-polarized light is constant or near constant as a function of incidence angle. Furthermore, the z-index mismatch $\Delta nz$ can be controlled to have the opposite polarity compared to the in-plane index difference $\Delta nx$, i.e., $\Delta nz<0$. This condition yields interfaces whose reflectivity for p-polarized light increases with increasing angles of incidence, as is the case for s-polarized light. If $\Delta nz>0$, then the reflectivity for p-polarized light decreases with angle of incidence. The foregoing relationships also of course apply to relationships involving $\Delta nz$ and $\Delta ny$, e.g., in cases where significant reflectivity and transmission are desired along two principal in-plane axes (such as a balanced or symmetric partially reflecting mirror film, or a partial polarizing film whose pass axis has significant reflectivity at normal incidence).

Figure 2:
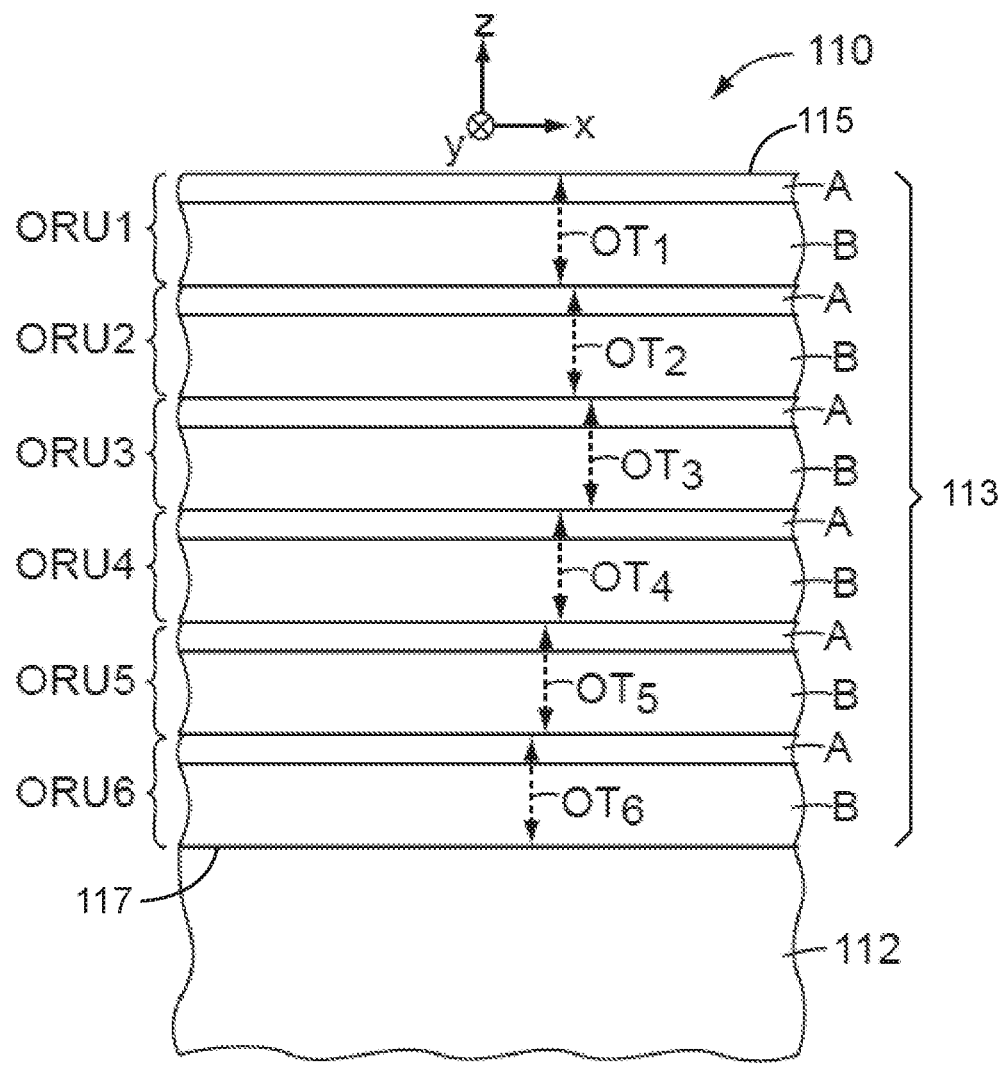
FIG. 2 is a schematic perspective view of a portion of a multilayer optical film, this view showing a packet or stack of microlayers and a plurality of ORUs.

In the schematic side view of FIG. 2, more interior layers of a multilayer film 110 are shown so that multiple ORUs can be seen. The film is shown in relation to a local x-y-z Cartesian coordinate system, where the film extends parallel to the x- and y-axes, and the z-axis is perpendicular to the film and its constituent layers and parallel to a thickness axis of the film.

In FIG. 2, the microlayers are labeled "A" or "B," the "A" layers being composed of one material and the "B" layers being composed of a different material, these layers being stacked in an alternating arrangement to form optical repeat units or unit cells ORU 1, ORU 2, . . . ORU 6 as shown. In many embodiments, a multilayer optical film composed entirely of polymeric materials would include many more than 6 optical repeat units if high reflectivities are desired. The multilayer optical film 110 is shown as having a substantially thicker layer 112, which may represent an outer skin layer, or a protective boundary layer ("PBL," see U.S. Pat. No. 6,783,349 (Neavin et al.)) that may separate the stack of microlayers shown in the figure from another stack or packet of microlayers (if present). Multilayer film 110 includes a single stack 113 having opposing first and second sides 115 and 117.

In general, the boundaries of the microlayers may be abrupt or can be gradual. For the latter case, the index of refraction can change gradually from a region of, e.g., high index to a region of low index within a distance along the thickness direction of a ½ wavelength. The microlayers described herein may each be a blend of two or more materials. For example each microlayer may comprise both materials A and B but in different ratios so as to provide a spatial variation of refractive index from low to high. Terms such as a "stack of microlayers", a "packet of microlayers", or the like, refer to a region in a film having a continuously varying index from high to low and back to high in a repeating fashion so as to form a continuous set of ORUs having no intervening optically thick layer or region. The optical thickness of an ORU is understood to be ½ wavelength, whether the index of refraction changes gradually or abruptly.

In some cases, the microlayers of a given stack or packet can have thicknesses and refractive index values corresponding to a ¼-wave stack, i.e., arranged in ORUs each having two adjacent microlayers of equal optical thickness, such ORU being effective to reflect by constructive interference light whose wavelength $\lambda$ is twice the overall optical thickness of the optical repeat unit. The "optical thickness" of a body refers to its physical thickness multiplied by its refractive index. A ¼-wave stack, in which the two adjacent microlayers in each ORU have equal optical thickness, is said to have an "f-ratio" of 0.5 or 50%. "F-ratio" in this regard refers to the ratio of the optical thickness of a constituent layer "A" to the optical thickness of the complete optical repeat unit, where the constituent layer "A" is assumed to have a higher refractive index than the constituent layer "B"; if the layer "B" has the higher refractive index, then the f-ratio is the ratio of the optical thickness of the constituent layer "B" to the optical thickness of the complete optical repeat unit. The use of a 50% f-ratio is often considered desirable because it maximizes the reflective power of the $1^{st}$ order reflection band of a stack of microlayers. However, a 50% f-ratio suppresses or eliminates the $2^{nd}$ order reflection band (and higher even orders). This too is often considered desirable in many applications; however, as described further elsewhere herein, it is not desirable for purposes of utilizing higher order harmonics of a single reflection band in order to provide three narrow reflection bands in the visible range. For purposes of the present application, multilayer optical films are contemplated that contain a microlayer stack whose f-ratio may be any suitable value in accordance with the teachings herein, with particular attention given to stacks whose f-ratio is small (e.g., less than 0.15, or less than 0.12, or less than 0.1) or large (e.g., greater than 0.85, or greater than 0.88, or greater than 0.9). Accordingly, in the embodiment of FIG. 2, the "A" layers are depicted for generality as being thinner than the "B" layers. Each depicted optical repeat unit (ORU 1, ORU 2, etc.) has an optical thickness (OT1, OT2, etc.) equal to the sum of the optical thicknesses of its constituent "A" and "B" layer, and each optical repeat unit provides $1^{st}$ order reflection of light whose wavelength λ is twice the overall optical thickness of the ORU.

To achieve reflectivity with a reasonable number of layers, adjacent microlayers may exhibit a difference in refractive index (Δnx) for light polarized along the x-axis of at least 0.03, for example. If high reflectivity is desired for two orthogonal polarizations, then the adjacent microlayers also may exhibit a difference in refractive index (Δny) for light polarized along the y-axis of at least 0.03, for example. In some cases, adjacent microlayers may have refractive index mismatches along the two principal in-plane axes (Δnx and Δny) that are close in magnitude, in which case the film or packet may behave as an on-axis mirror or partial mirror. Alternatively, for reflective polarizers that are designed to be partially reflective for the pass axis polarization, adjacent microlayers may exhibit a large difference in refractive index (Δnx) for light polarized along the x-axis and a smaller but still substantial difference in refractive index (Δny) for light polarized along the y-axis. In variations of such embodiments, the adjacent microlayers may exhibit a refractive index match or mismatch along the z-axis (Δnz=0 or Δnz large), and the mismatch may be of the same or opposite polarity or sign as the in-plane refractive index mismatch (es). Whether the reflectivity of the p-polarized component of obliquely incident light increases, decreases, or remains the same with increasing incidence angle can be controlled by such tailoring of Δnz.

At least some of the microlayers in at least one packet of the disclosed multilayer optical films may if desired be birefringent, e.g., uniaxially birefringent or biaxially birefringent, although in some embodiments, microlayers that are all isotropic may also be used. In some cases, each ORU may include one birefringent microlayer, and a second microlayer that is either isotropic or that has a small amount of birefringence relative to the other microlayer. In alternative cases, each ORU may include two birefringent microlayers.

The disclosed multilayer optical films can be made using any suitable light-transmissive materials, but in many cases it is beneficial to use low absorption polymer materials. With such materials, absorption of a microlayer stack over visible and infrared wavelengths can be made small or negligible, such that the sum of reflection and transmission for the stack (or an optical film of which it is a part), at any given wavelength and for any specified angle of incidence and polarization state, is approximately 1, i.e., R+T≈1, or R≈1−T. Exemplary multilayer optical films are composed of polymer materials and may be fabricated using coextruding, casting, and orienting processes. Reference is made to U.S. Pat. No. 5,882,774 (Jonza et al.) "Optical Film", U.S. Pat. No. 6,179,948 (Merrill et al.) "Optical Film and Process for Manufacture Thereof", U.S. Pat. No. 6,783,349 (Neavin et al.) "Apparatus for Making Multilayer Optical Films", and patent application publication US 2011/0272849 (Neavin et al.) "Feedblock for Manufacturing Multilayer Polymeric Films". The multilayer optical film may be formed by coextrusion of the polymers as described in any of the aforementioned references. The polymers of the various layers may be chosen to have similar rheological properties, e.g., melt viscosities, so that they can be co-extruded without significant flow disturbances. Extrusion conditions are chosen to adequately feed, melt, mix, and pump the respective polymers as feed streams or melt streams in a continuous and stable manner. Temperatures used to form and maintain each of the melt streams may be chosen to be within a range that avoids freezing, crystallization, or unduly high pressure drops at the low end of the temperature range, and that avoids material degradation at the high end of the range.

In brief summary, the fabrication method can include: (a) providing at least a first and a second stream of resin corresponding to the first and second polymers to be used in the finished film; (b) dividing the first and the second streams into a plurality of layers using a suitable feedblock, such as one that includes: (i) a gradient plate comprising first and second flow channels, where the first channel has a cross-sectional area that changes from a first position to a second position along the flow channel, (ii) a feeder tube plate having a first plurality of conduits in fluid communication with the first flow channel and a second plurality of conduits in fluid communication with the second flow channel, each conduit feeding its own respective slot die, each conduit having a first end and a second end, the first end of the conduits being in fluid communication with the flow channels, and the second end of the conduits being in fluid communication with the slot die, and (iii) optionally, an axial rod heater located proximal to said conduits; (c) passing the composite stream through an extrusion die to form a multilayer web in which each layer is generally parallel to the major surface of adjacent layers; and (d) casting the multilayer web onto a chill roll, sometimes referred to as a casting wheel or casting drum, to form a cast multilayer film. This cast film may have the same number of layers as the finished film, but the layers of the cast film are typically much thicker than those of the finished film. Furthermore, the layers of the cast film are typically all isotropic. A multilayer optical film with controlled low frequency variations in reflectivity and transmission over a wide wavelength range can be achieved by the thermal zone control of the axial rod heater, see e.g., U.S. Pat. No. 6,783,349 (Neavin et al.).

After the multilayer web is cooled on the chill roll, it can be drawn or stretched to produce a finished or near-finished multilayer optical film. The drawing or stretching accomplishes two goals: it thins the layers to their desired final thicknesses, and it may orient the layers such that at least some of the layers become birefringent. The orientation or stretching can be accomplished along the cross-web direction (e.g., via a tenter), along the down-web direction (e.g., via a length orienter), or any combination thereof, whether simultaneously or sequentially. If stretched along only one direction, the stretch can be "unconstrained" (wherein the film is allowed to dimensionally relax in the in-plane direction perpendicular to the stretch direction) or "constrained" (wherein the film is constrained and thus not allowed to dimensionally relax in the in-plane direction perpendicular to the stretch direction). If stretched along both in-plane directions, the stretch can be symmetric, i.e., equal along the orthogonal in-plane directions, or asymmetric. Alternatively, the film may be stretched in a batch process. In any case, subsequent or concurrent draw reduction, stress or strain equilibration, heat setting, and other processing operations can also be applied to the film.

At least one difference between vacuum deposited stack designs and coextruded polymeric multilayer stack designs is the shape of the layer profile distribution. With vacuum deposited films, the desired spectrum is achieved by individually adjusting the thickness of every layer in the stack so it conforms to a computer optimized stack design. In this manner, issues such as spectral ripple are routinely minimized. Adjacent layers sometimes differ in thickness by a factor of 10, with thickness values often ranging from about $0.05\lambda$ to $1.0\lambda$. With coextruded polymeric film stacks, on-line monitoring and control of individual layers in this manner is not yet a viable option with this technology. As a result, spectral shape is controlled mainly by the shape of a continuous and smoothly varying layer thickness profile. Such profiles are, however, not restricted to polymeric film stacks.

The optical films of the present description typically have a first order reflection band in the infrared and three distinct higher order (for example, each band being third order, or $4^{th}$, $5^{th}$ and $6^{th}$ order bands, or or $5^{th}$, $6^{th}$ and $7^{th}$ order bands) reflection bands in the visible wavelength range (400 nm to 700 nm). Each wavelength in an $m^{th}$-order band is $1/m$ times a wavelength in the first order band. The location and bandwidth of the higher order bands are therefore determined by the location and bandwidth of the first order band. It is typically desired for the visible reflection bands to have a bandwidth less than 50 nm, or less than 45 nm, and greater than 5 nm, or greater than 10 nm, and it is typically desired for the bands to be distinct (no overlapping wavelengths). In order to achieve a desired wavelength range for the higher order reflection bands, the first order reflection band should lie in a suitable wavelength range (e.g., an infrared reflection band with a suitably wide bandwidth). This can be achieved by tailoring the thickness profile; that is, by tailoring the optical thicknesses of the ORUs according to a thickness gradient along the z-axis or thickness direction of the film, whereby the optical thickness of the optical repeat units increases, decreases, or follows some other functional relationship as one progresses from one side of the stack (e.g., the top) to the other side of the stack (e.g., the bottom). The three higher order reflection bands may be red, green and blue reflection bands, for example.

Figure 3A:
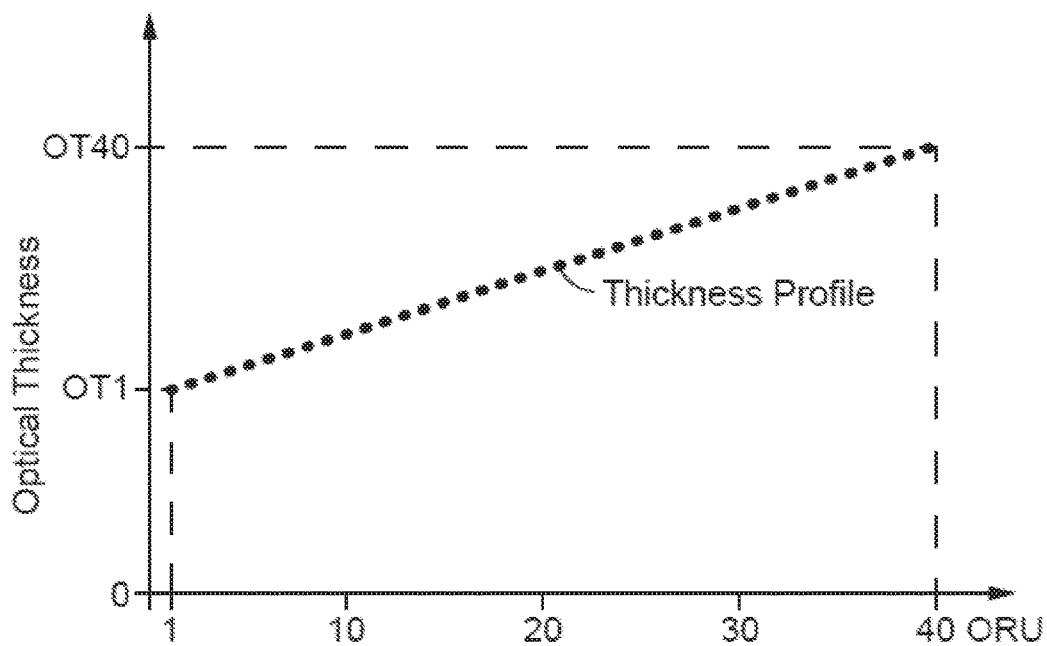
FIGS. 3A-3C are representations of layer thickness profiles.

FIG. 3A is a schematic illustration of a layer thickness profile of an optical film having a single stack of optical repeat units. In this case, 40 optical repeat units are included and the thickness varies linearly across the layer. In some embodiments, the layer thickness profile is substantially continuous. A layer thickness profile may be described as substantially continuous if to a good approximation (e.g., to within 10 percent error, or to within 5 percent error, or to within 3 percent error), the optical thickness of any interior optical repeat unit can be determined by linear extrapolation from the optical thickness of the optical repeat units on either side of the interior optical repeat unit.

Figure 3B:
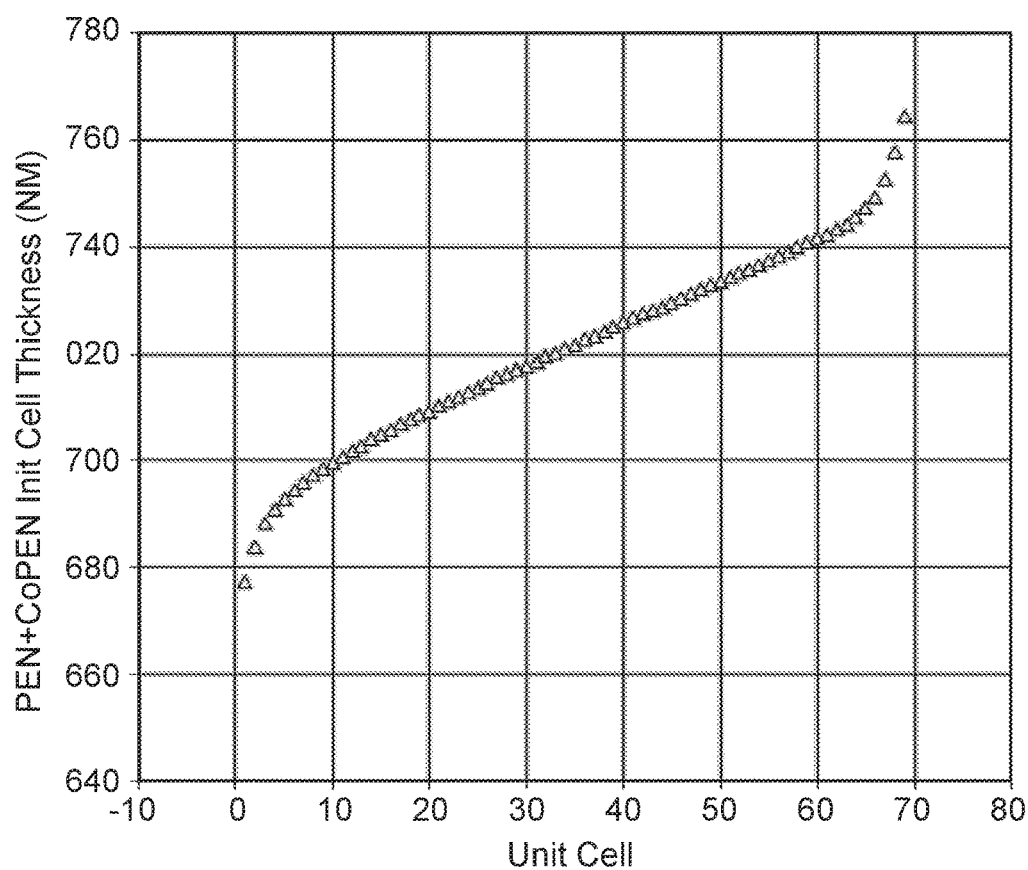
Figure 3C:
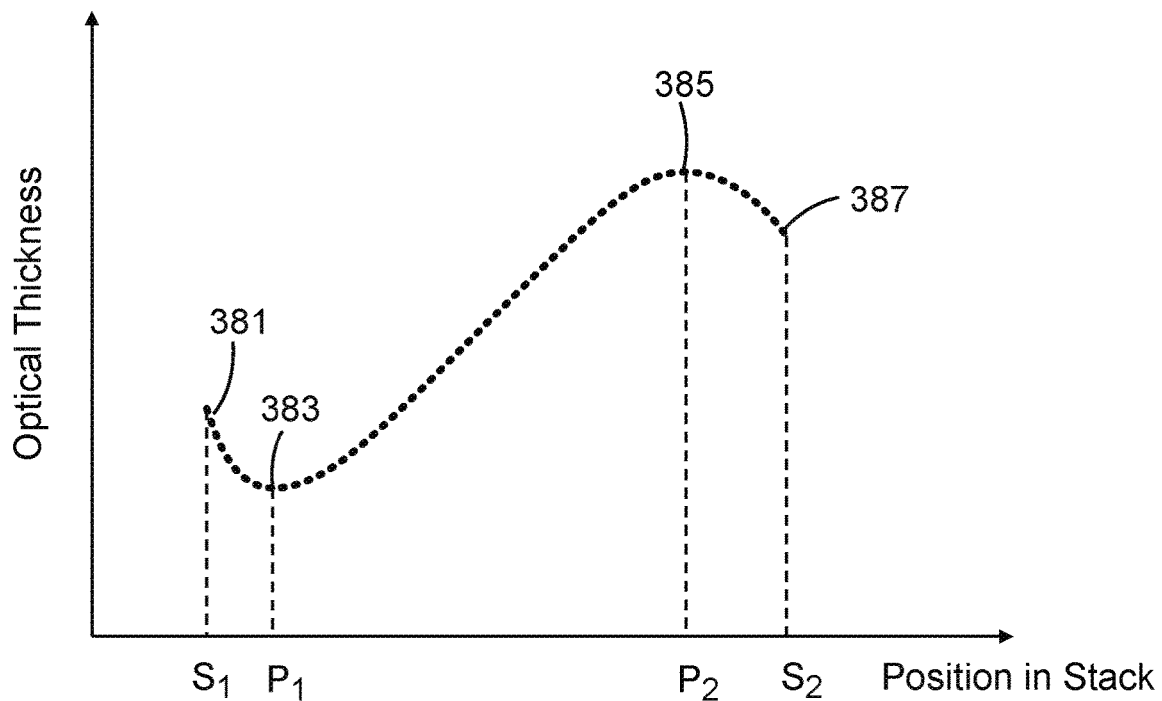

In some embodiments, the optical repeat units have an optical thickness that varies that substantially continuously from a first side of the single stack to an opposing second side of the single stack. The thickness variation may be chosen to provide sharpened band edges as described in U.S. Pat. No. 6,157,490 (Wheatley et al.), for example. In some embodiments, the optical thickness of the optical repeat units varies between a minimum value and a maximum value, the maximum value minus the minimum value being no more than 20 percent of the maximum value. In some embodiments, the optical thickness monotonically increases from a first side of the single stack to an opposing second side of the single stack. As illustrated in FIG. 3C, which is a plot of the optical thickness of the optical repeat units in a single stack as a function of vertical (z-coordinate of FIG. 2) position in the single stack, in some embodiments, the optical thickness monotonically decreases from an optical repeat unit 381 at the first side at position $S_1$ of the single stack to an optical repeat unit 383 (which has a minimum optical thickness value) within the single stack at position $P_1$, monotonically increases from the optical repeat unit 383 to an optical repeat unit 385 (which has a maximum optical thickness value) within the single stack at position $P_2$ disposed between the second side at positon $S_2$ of the single stack and the optical repeat unit 383, and monotonically decreases from the optical repeat unit 385 to the second side at positon $S_2$ of the single stack. In some embodiments, a separation between the first and second optical repeat units $(P_2-P_1)$ is at least half, or at least 70%, of a thickness of the single stack $(S_2-S_1)$. Other possible layer profiles include a smile profile (thinner in the middle of the stack than at the edges) and a frown profile (thicker in the middle of the stack than at the edges).

In some embodiments, an optical film has distinct first, second and third reflection bands where the first, second and third reflection bands are each visible reflection bands at normal incidence for at least one polarization state and two of the first, second and third reflection bands are fifth and sixth order harmonics of a single first order band, while the other of the first, second and third reflection bands are either a fourth order or a seventh order harmonic of the single first order band.

Figure 4A:
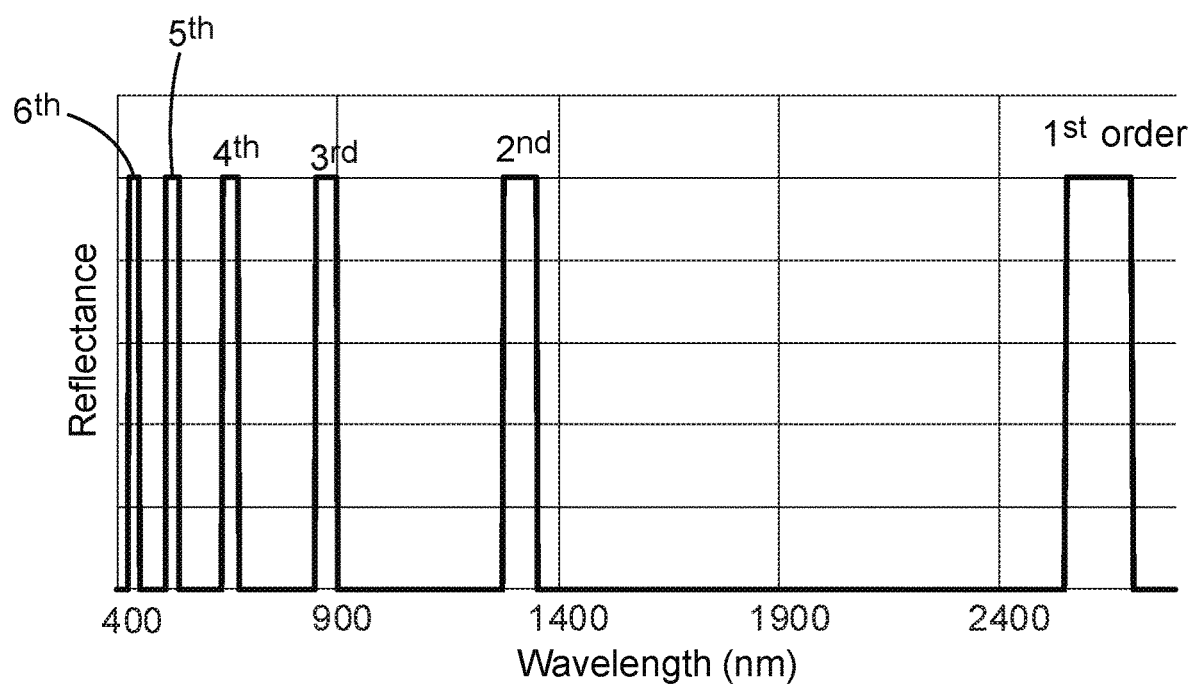
FIGS. 4A-5B are idealized schematic representations of various harmonic reflection bands.
Figure 4B:
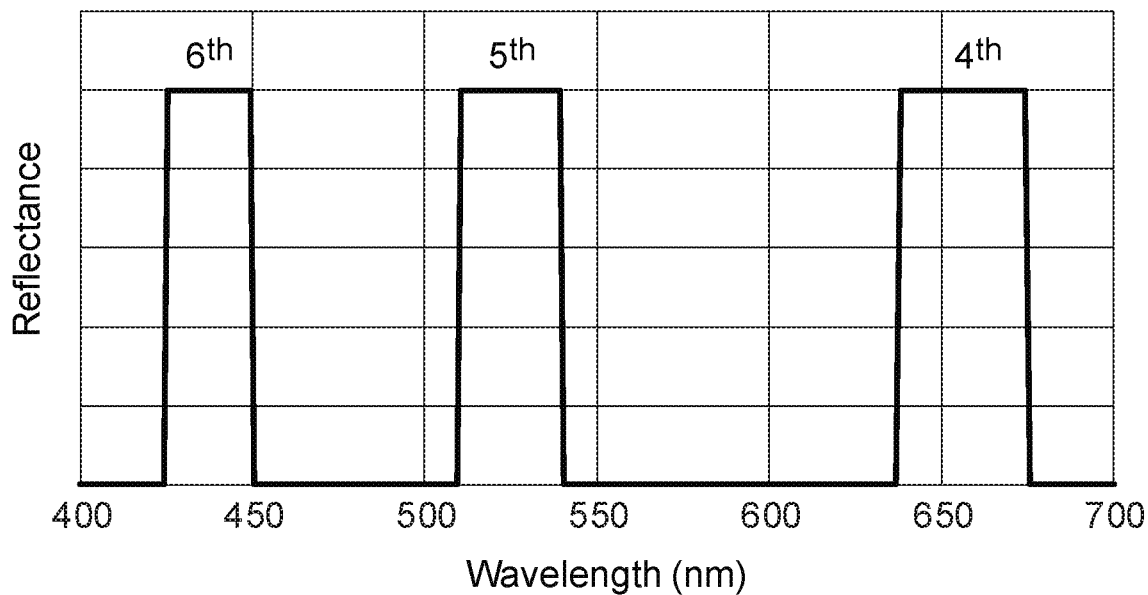

FIG. 4A shows an idealized schematic representation of various harmonic reflection bands that a microlayer stack such as that of FIG. 2 may produce depending on design details of the stack. A reflection band in this regard, for purposes of this application, refers to a single confined region of increased reflectivity on a plot of reflectivity versus wavelength, where the reflectivity achieves a value of at least 80% within the region and where the reflectivity is less than 50% in adjacent wavelength ranges on either side of the region. The reflection band of each harmonic order is shown in simplified or idealized fashion to have two opposed, straight, vertical band edges, a flat or uniform reflectivity within the band, and no ripple or ringing. Although reflection bands of this rectangular shape cannot be found in real films, the idealized rectangular reflection bands can be useful for approximating or representing an actual reflection band having a more complicated shape. For illustrative purposes, a $1^{st}$, $2^{nd}$, $3^{rd}$, $4^{th}$, $5^{th}$, and $6^{th}$ order reflection band are all shown on the same graph, but in practice some may be absent or substantially absent from the reflectivity spectrum, depending on the f-ratio used for the stack. Also, the reflectivities of the harmonics are schematically shown as independent of the order number, but the reflectivity more typically depends on the order number. For example, in some cases, a higher order reflection band may have a lower reflectivity than a lower order reflection band, and in some cases, a reflection band that has greater reflectivity than another reflection band may also have a higher order number. Each of the $4^{th}$, $5^{th}$, and $6^{th}$ order reflection bands are in the visible wavelength spectrum (wavelengths from 400 nm to 700 nm). This can be seen most clearly in FIG. 4B which illustrates the reflectivity of the stack of FIG. 4A for wavelengths between 400 and 700 nm. It can be seen in FIG. 4B that each of the $4^{th}$, $5^{th}$, and $6^{th}$ order reflection bands are in the visible range and have a bandwidth less than 50 nm.

Figure 5A:
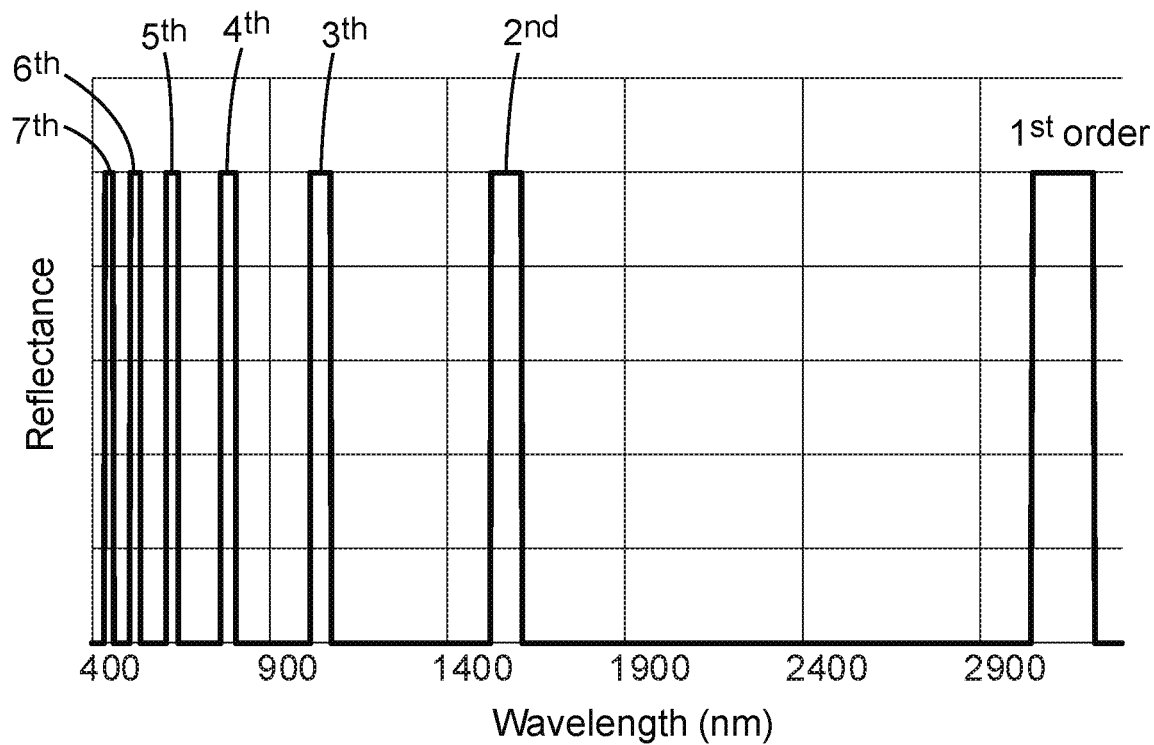
Figure 5B:
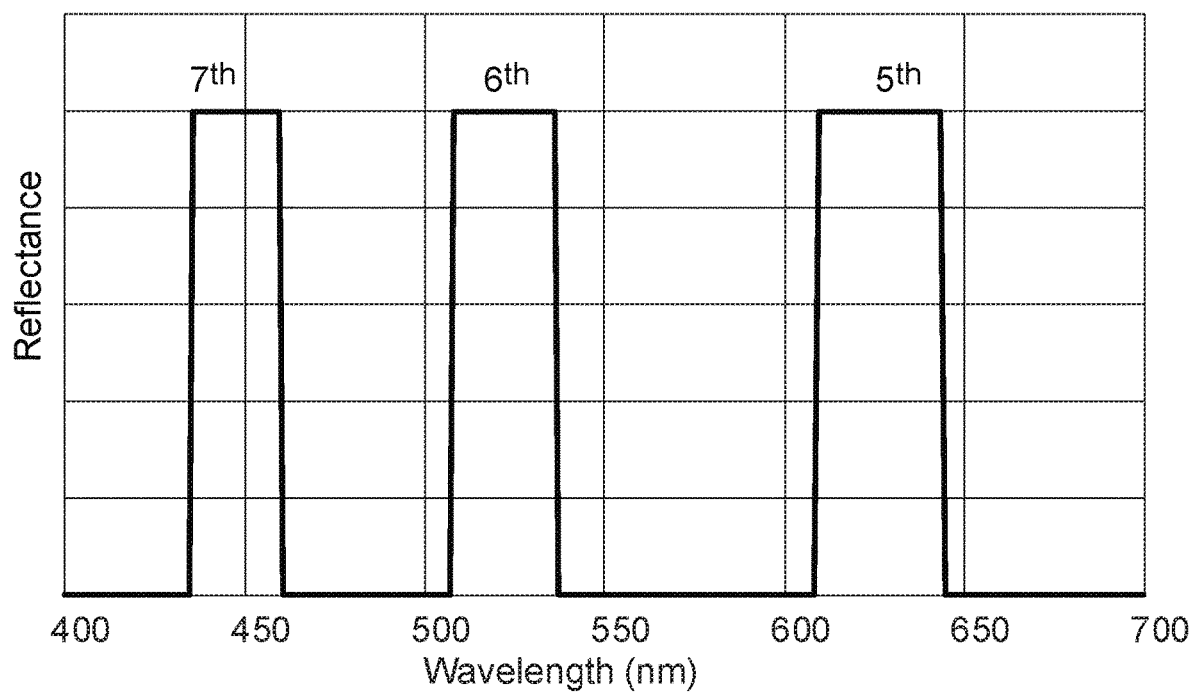

Similarly, FIG. 5A shows an idealized schematic representation shows various harmonic reflection bands. $1^{st}$, $2^{nd}$, $3^{rd}$, $4^{th}$, $5^{th}$, $6^{th}$ and $7^{th}$ order reflection bands are shown. Each of the $5^{th}$, $6^{th}$ and $7^{th}$ order reflection bands are in the visible wavelength spectrum. This can be seen most clearly in FIG. 5B which illustrates the reflectivity of the stack of FIG. 5A for wavelengths between 400 and 700 nm. It can be seen in FIG. 5B that each of the $5^{th}$, $6^{th}$ and $7^{th}$ order reflection bands are in the visible range and have a bandwidth less than 50 nm.

Figure 6:
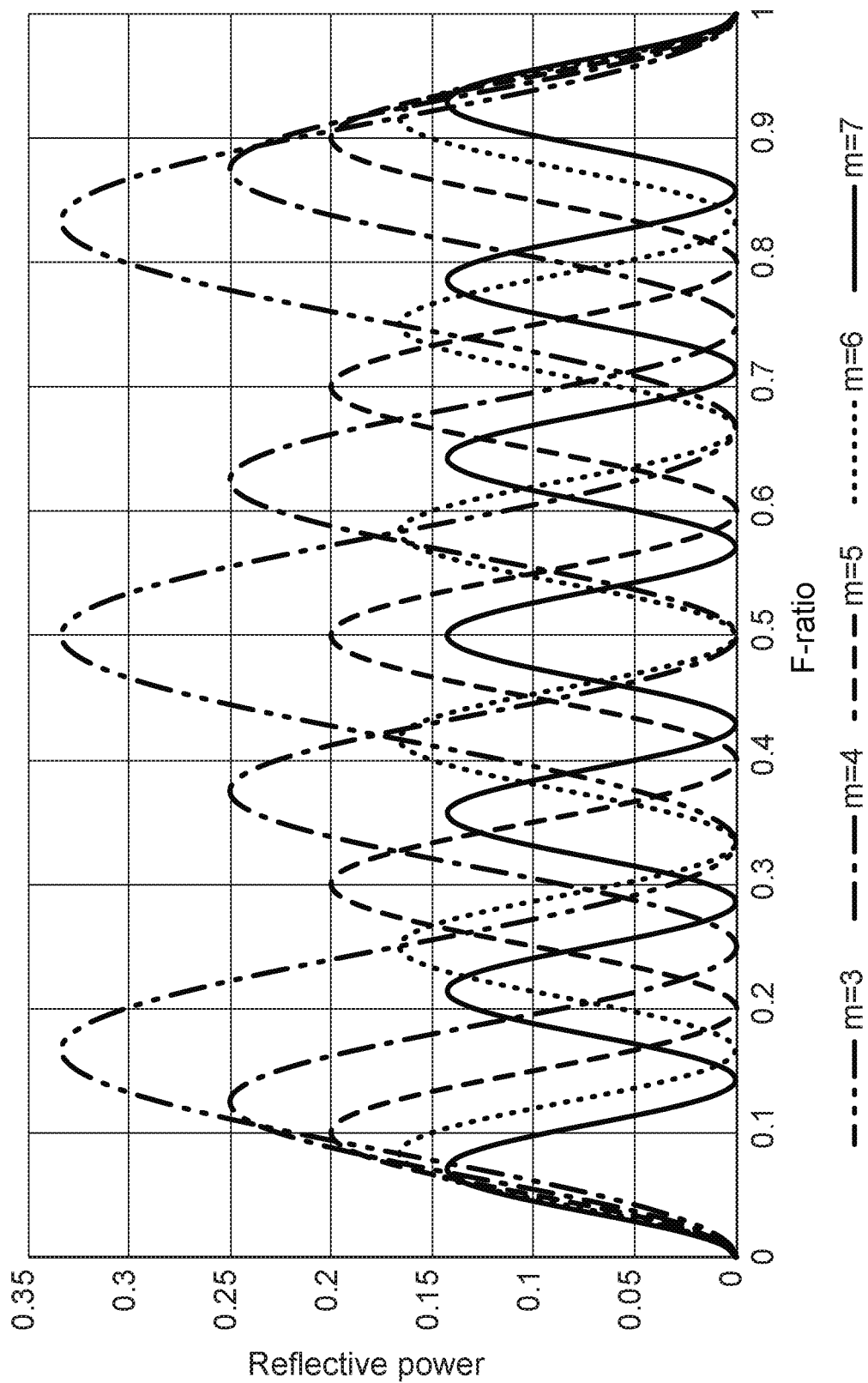
FIG. 6 is a graph of relative reflective power in higher order harmonics as a function of the f-ratio of a microlayer stack.

The relative reflective power of the $3^{rd}$, $4^{th}$, $5^{th}$, $6^{th}$ and $7^{th}$ order reflection bands as a function of the f-ratio of a microlayer stack is shown in FIG. 6. In this regard, the "reflective power" of a microlayer stack refers to the area under the negative of the Log(1−R) spectrum (optical density), normalized by dividing by the wavelength. With numerical integration, each incremental area of the reflective power spectrum can be divided by the local wavelength: $(\text{Log}(1-R(\lambda n))) \times (\lambda_{n+1}-\lambda_n)/\lambda_n$. (The parameter "R" here refers to the reflectivity of the stack, which is a function of wavelength. A value of R=1 corresponds to a reflectivity of 1.0 or 100%, a value of R=0.5 corresponds to a reflectivity of 0.5 or 50%, and so forth.) The reflective power of individual harmonic bands generated by the stack can be determined in this way, provided they do not overlap with one another. By optical modeling or experimentation it can be shown that the reflective power of a stack of alternating high and low refractive index layers with small refractive index differentials, such as those found in polymeric multilayer optical stacks, is proportional to the square of the refractive index differential. The effect of the f-ratio on this reflective power can be expressed using an effective index differential for a given mth harmonic order band as follows:

$$\Delta n_{\text{effective}} = c_m \frac{\pi}{4} \Delta n,$$

where $\Delta n$ is the actual refractive index difference, and $c_m$ is the Fourier coefficient of the Fourier representation of the asymmetric square wave refractive index waveform of the stack for the $m^{th}$ order term in the series. The reflective power (RP) in a given harmonic reflection band can be shown to be proportional to the square of this effective index differential:

$$RP \propto (\Delta n_{\text{effective}})^2.$$

The Fourier coefficient for each order m of an asymmetric square wave is given by:

$$c_m = \left(\frac{4}{m\pi}\right) \times |\sin(m\pi f)|,$$

where f is the f-ratio. From these equations one can see that the reflective power RP is proportional to the following simple formula:

$$RP \propto \left(\frac{1}{m}\right) \sin^2(m\pi f).$$

This function, after normalizing by setting the maximum reflective power of the $1^{st}$ order reflection band (which occurs when the f-ratio equals 0.5) to 1.0, is plotted in FIG. 6 for several harmonic orders (m=3, 4, 5, 6 and 7). It can be seen from this plot, that by choosing relatively low (less than 0.1) or relatively high (greater than 0.9) f-ratios, the reflective power of the $4^{th}$, $5^{th}$, $6^{th}$ and $7^{th}$ order reflection bands can be made to be approximately equal. In some embodiments, the f-ratio may be in the range of 0.03, or 0.04, to 0.09, or 0.10, or 0.12, or in the range of 0.88, or 0.90, or 0.91, to 0.96 or 0.97. Discussion of reflective power in lower order harmonics can be found in US 2014/0313572 (Kivel et al.) which is hereby incorporated herein by reference except to the extent that it might contradict the present description.

Figure 16:
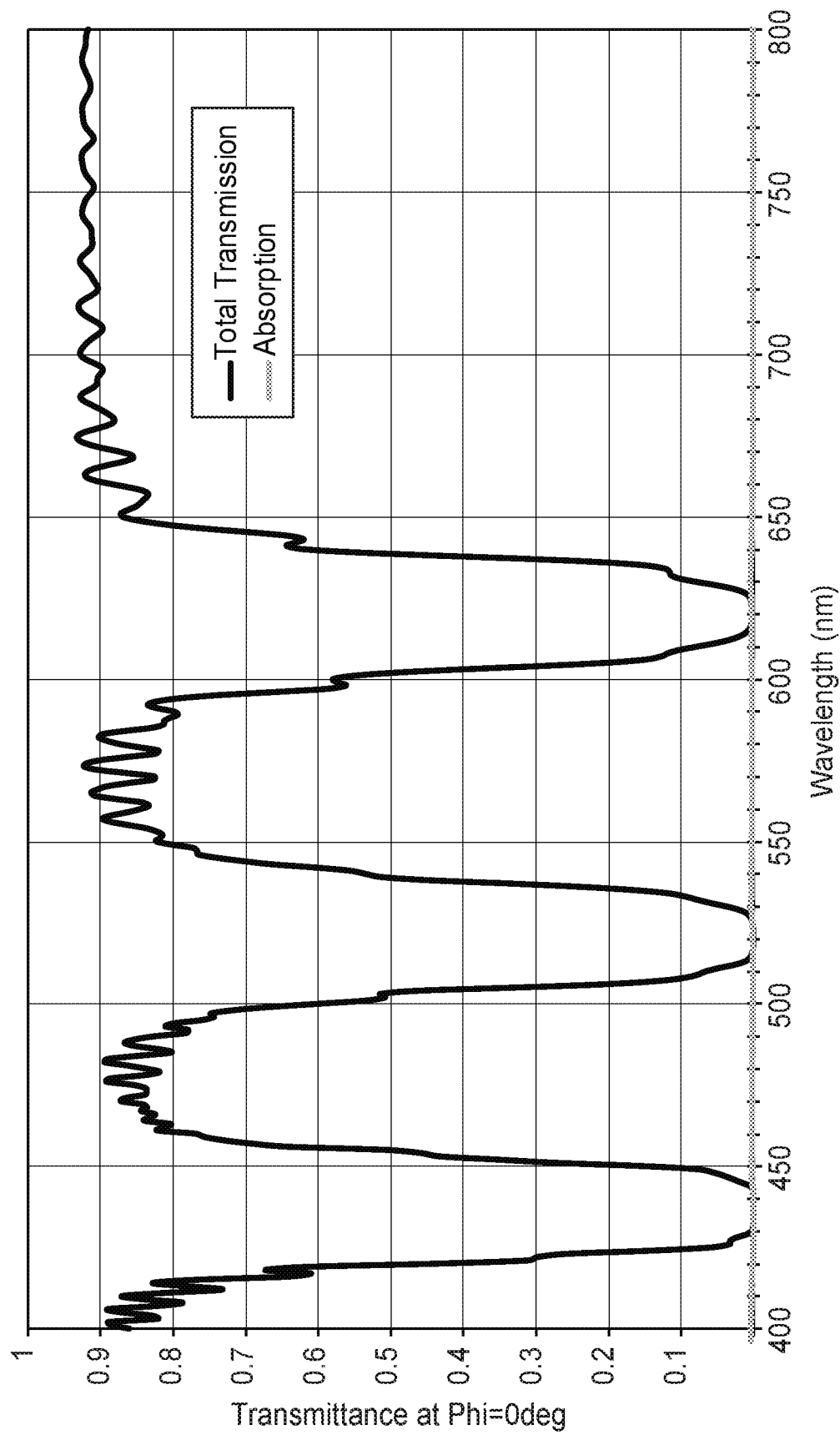
FIG. 16 is a graph of the transmission coefficient of an optical film versus wavelength.

In some embodiments, a reflective film includes fourth, fifth and sixth order visible refection bands. In other embodiments, a reflective film includes fifth, sixth and seventh order visible refection bands. In these embodiments, the reflection bands may each result from a single stack of optical repeat units. In other embodiments, a reflective film may include more than one stack of optical repeat units. In some embodiments, a reflective film includes different first, second and third reflection bands where one of the first, second and third reflection bands results from a first stack of optical repeat units and a different one of the first, second and third reflection bands results from a different second stack of optical repeat units. In some embodiments, the first, second and third reflection bands result from different first, second and third stacks of optical repeat units. For example, in some embodiments, each of the first, second and third reflection bands are third order harmonics of three different first order reflection bands provided by three different stacks of optical repeat units. An example of the modeled transmission spectra of a three packet reflective film having 150 alternating layer of polyethylene terephthalate (PET) and poly(methyl methacrylate) (PMMA) where each packet produces a distinct visible reflection band is shown in FIG. 16.

The use of a low f-ratio may be desirable in some cases in order to reduce the amount of strain-hardening material used in the optical film. The higher index layers in the optical repeat units are typically formed from a strain-hardening polymer which is often more expensive than non-strain hardening material that can be used for the low index layers. For example, the high index layers may be made from polyethylene naphthalate (PEN), which is a strain-hardening material, while the low index layers may be made from (PMMA), which is not strain hardening. PEN is significantly more expensive than PMMA and therefore a low f-ratio may be desired in order to reduce the cost of the optical film. In some embodiments, the optical film includes no more than about 15%, or no more than about 10%, by volume of a strain-hardening material.

Figure 7:
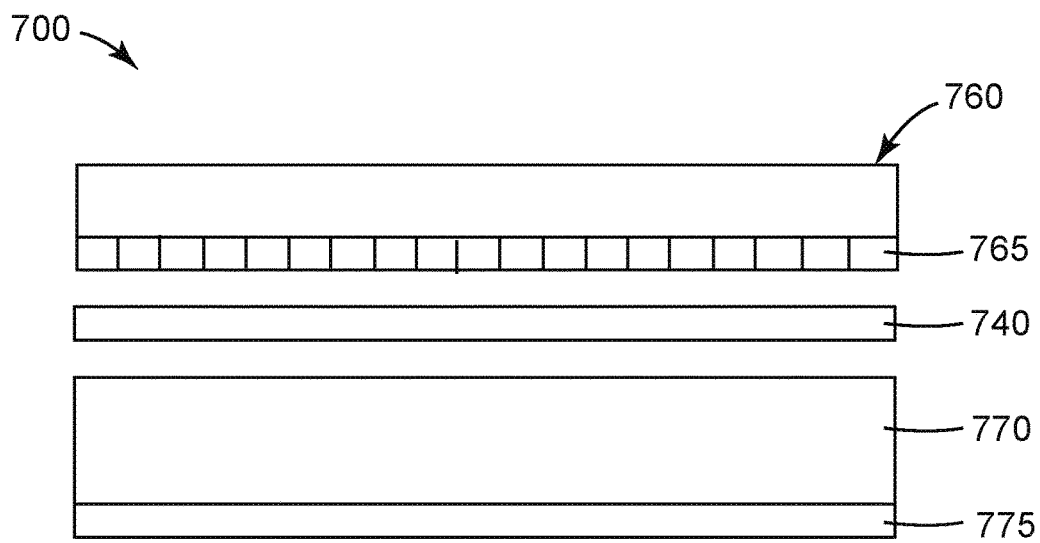
FIG. 7 is a schematic cross-sectional view of a display including a reflective optical film.

Reflective optical films having a high-order harmonic reflection band structure have been found to be particularly useful in display applications where the optical film can increase the color gamut as explained further below. FIG. 7 is a schematic cross-sectional view of display 700 which includes a display panel 760, a backlight having a light guide 770 and a back reflector 775 and a reflective optical film 740 of the present description disposed between the display panel 760 and the back reflector 775. Reflective optical film 740 may be a reflective polarizer (e.g., reflective optical film 740 may have distinct first, second and third reflection bands which are visible reflection bands at normal incidence for a first polarization state and the optical film 740 may be substantially transmissive at normal incidence for an orthogonal second polarization state) and may be considered to part of a backlight system including light guide 770 and back reflector 775. The backlight system may further include crossed prism films (e.g., Brightness Enhancement Films (BEF) available from 3M Company, St. Paul, Minn.) which may be disposed between the reflective optical film 740 and the light guide 770. Since the optical film 740 may be positioned at the front surface of the backlight system and may only reflect light having a polarization along the block axis and having a wavelength in certain wavelength bands, the reflective optical film 740 may be referred to as a front reflector or as a front surface partial reflector. Reflective optical film 740 may have a transmission for normally incident light polarized along the pass axis of at least about 80% throughout the visible wavelength range of 400 nm to 700 nm.

The display panel 760 includes a plurality of color filters 765 adapted to transmit light in different first, second and third wavelength ranges. The first, second and third wavelength ranges define first and second overlap ranges as described elsewhere herein. In some embodiments, the first, second and third reflection bands of the optical film does not include wavelengths in the first and second overlap ranges. Such a configuration has been found to provide a higher color gamut compared to a reference display which utilizes a conventional wide-band reflective polarizer in place of the optical film 740 but that is otherwise equivalent to display 700. The conventional wide-band reflective polarizer may have a reflectivity throughout the wavelength range of 400 to 700 nm of at least 80 percent for light polarized along the pass axis of the reflective polarizer and less than 20 percent for light polarized along the block axis of the reflective polarizer. The conventional wide-band reflective polarizer may be Dual Brightness Enhancement Film (DBEF) available from 3M Company, St. Paul, Minn.

In some embodiments, the difference between the color gamut of display 700 and the reference display is at least 3% NTSC or at least 5% NTSC. NTSC refers to the color gamut introduced by the National Television System Committee of the United States in 1953. The color gamut can be depicted using the well-known 1931 CIE x-y chromaticity diagram, promulgated by the Commission International de l'Eclairage (International Commission on Lighting) or "CIE". The NTSC standard defines a triangle on the CIE x-y chromaticity diagram. A color gamut of a display can be described as an area on the CIE x-y chromaticity diagram and this color gamut can be expressed as a percent of the area of the triangle defined by the NTSC standard. So, for example, a display having a color gamut higher than a reference display by 3% NTSC means that the area on the CIE x-y chromaticity diagram for light output of the display is higher than that of the reference display by 3% of the area of the NTSC standard triangle on the CIE x-y chromaticity diagram.

In many applications, the reflection properties of a film may be characterized in terms of "hemispheric reflectivity," $R_{hemi}(\lambda)$, meaning the total reflectivity of a component (whether a surface, film, or collection of films) when light (of a certain wavelength or wavelength range of interest) is incident on it from all possible directions. Thus, the component is illuminated with light incident from all directions (and all polarization states, unless otherwise specified) within a hemisphere centered about a normal direction, and all light reflected into that same hemisphere is collected. The ratio of the total flux of the reflected light to the total flux of the incident light for the wavelength range of interest yields the hemispheric reflectivity, $R_{hemi}(\lambda)$. Characterizing a reflector in terms of its $R_{hemi}(\lambda)$ may be especially convenient for backlight recycling cavities because light is often incident on the internal surfaces of the cavity—whether the front reflector, back reflector, or side reflectors—at all angles. Further, unlike the reflectivity for normal incident light, $R_{hemi}(\lambda)$ is insensitive to, and already takes into account, the variability of reflectivity with incidence angle, which may be very significant for some components within a recycling backlight (e.g., prismatic films).

It is understood that for numerous electronic display applications using backlights, and that for backlights for general and specialty lighting applications, it may be desirable for the reflector film forming the backlight's backplane to have high reflectivity characteristics. Indeed, it is further understood that the hemispheric reflectivity spectrum of the back reflector, $R^b_{hemi}(\lambda)$ strongly correlates with light output efficiency of a backlight; the higher the $R^b_{hemi}(\lambda)$ value across the visible light spectrum, the higher the output efficiency of the backlight. This is particularly true for recycling backlights, where other optical films may be configured over the backlight exit aperture to provide collimated or polarized light output from the backlight.

Further, it is convenient to define the optical properties of the front reflector using the hemispheric reflectivity of the front reflector, $R^f_{hemi}(\lambda)$, and the transmission, $T^{pol}(\Omega,\lambda)$ where "pol" (sometimes illustrated with the symbol "∥") refers to the polarization state that is aligned with the pass-axis of the bottom absorbing polarizer of an LCD panel, and $\Omega$ represents the solid angle of interest representing the viewers' geometrical location relative to the backlight output surface. A particular value of $\Omega$, can be represented by a combination the incidence angle $\theta$ and an azimuthal angle $\varphi$. $T^{pol}(\Omega,\lambda)$ which can also be written as $T^{pol}(\theta,\varphi, \lambda)$, represents the transmission of usable light (light having a polarization such that it can pass through the bottom absorbing polarizer of an LCD panel). The value of $T^{pol}(\Omega, \lambda)$ is defined as a transmission coefficient: the ratio of the transmitted intensity at an angle centered on the viewer angle of interest, $\Omega$, relative to the front reflector plane, with the front reflector and an absorbing polarizer overlaying an all-angle light source (e.g., an angle-mixed recycling cavity), to the intensity at 0 degrees for only the absorbing polarizer overlaying the all-angle light source. For this measurement, the polarization properties of the front reflector are appropriately aligned with the pass axis of the absorbing polarizer.

The intensity gain, G, resulting from the front reflector can be written in terms of $T^{pol}(\Omega,\lambda)$, the hemispheric reflectivity of the front reflector, $R^f_{hemi}(\lambda)$, and the hemispheric reflectivity of the back reflector, $R^b_{hemi}$, as $$G=T^{pol}(\Omega,\lambda)/(1-R^f_{hemi}(\lambda)\times R^b_{hemi}(\lambda)) \quad \text{Equation 1:}$$

The intensity gain G is the spectra of the fractional increase in backlight intensity due to the presence of the front reflector.

$R_{hemi}(\lambda)$ of the front or back reflector (i.e., $R^f_{hemi}(\lambda)$) or $R^b_{hemi}(\lambda)$) can be measured using an apparatus described in US Pat. App. Pub. No. 2013/0215512 (Coggio, et al.). A commercial six inch integrating sphere manufactured by Labsphere (Labsphere, Inc., North Sutton, N.H.) and having a Spectralon® reflective coating, with three mutually orthogonal ports, is used to illuminate samples and to determine hemispherical reflectance spectrum, $R_{hemi}(\lambda)$. A stabilized light source illuminated the sphere through one port. A Photo Research® PR650 spectrophotometer (available from Photo Research Inc., Chatsworth, Calif.) is used to measure the sphere internal wall radiance through a second port. The sample is placed on the third port. Calibration of the integrating sphere wall radiance is done by using a known reflectance standard (Spectralon® Reference Target SRT-99-050 available from Labsphere, Inc., North Sutton, N.H.) placed on the third port, and sphere-wall radiance was measured with and without the calibration standard. $R_{hemi}(\lambda)$ is measured by placing samples on the third port; sample hemispheric reflectance $R_{hemi}(\lambda)$ can be obtained by taking the ratio of the sphere wall radiance with and without the sample and employing a simple integrating sphere intensity-gain algorithm.

It is expected that the equilibrium intensity distribution within the integrating sphere approximates a Lambertian distribution, meaning the probability distribution of intensity with respect to incidence angle on the sample, will fall as cosine ($\theta$), where $\theta=0$ is normal to the sample.

Figure 8:
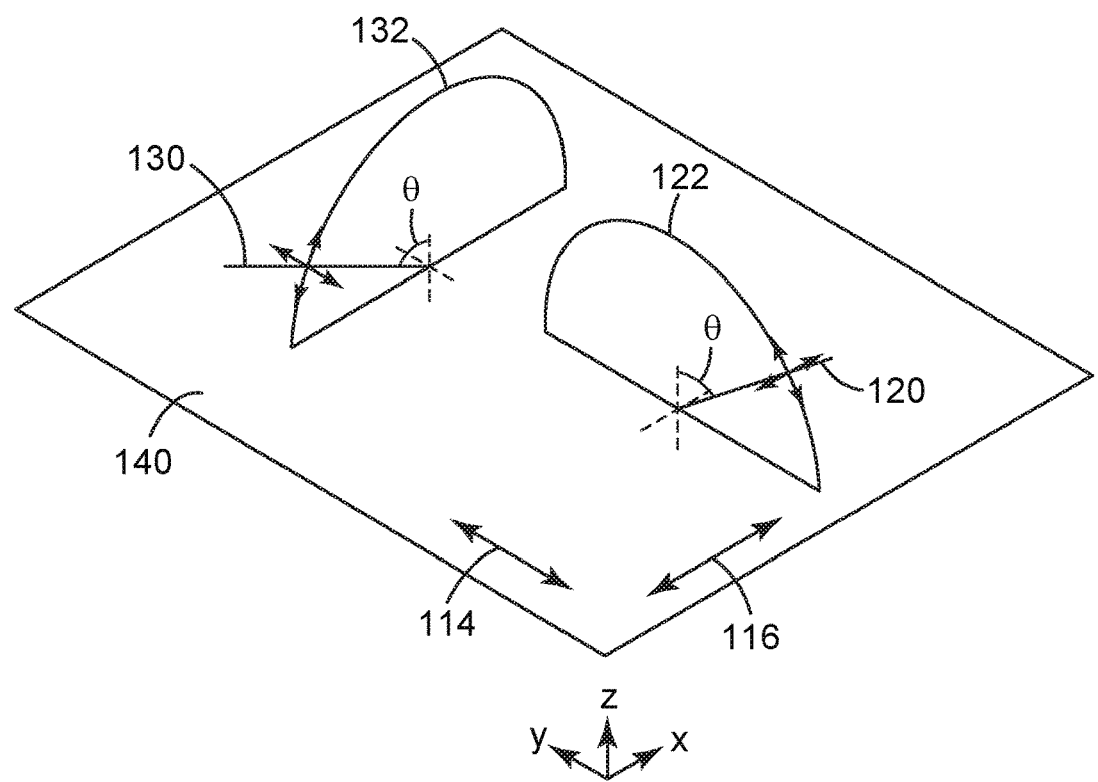
FIG. 8 is a schematic perspective view of a reflective optical film.

FIG. 8 is a schematic perspective view of a reflective film. FIG. 8 illustrates a light ray 130 that is incident on a reflective film 140 at an angle of incidence $\theta$, thereby forming a plane of incidence 132. The reflective film 140 includes a first reflection axis 116 that is parallel to the x-axis, and a second reflection axis 114 that is parallel to the y-axis. The plane of incidence 132 of ray 130 is parallel to the first reflection axis 116. Ray 130 has a p-polarized component that is in the plane of incidence 132, and an s-polarized component that is orthogonal to the plane of incidence 132. The p-polarized light of ray 130 will be reflected by the reflective film with a reflectivity of $R_{pp-x}$ (the projection of the electric field of the p-polarized light of ray 130 onto the plane of reflective film 140 is parallel to the x-direction), while the s-polarized light of ray 130 is reflected by the reflective film with a reflectivity of $R_{ss-y}$ (the electric field of the s-polarized light of ray 130 is parallel to the y-direction).

Further, FIG. 8 illustrates ray 120 that is incident on the reflective film in a plane of incidence 122 that is parallel to the second reflection axis 114 of the film 140. Ray 120 has a p-polarized component that is in the plane of incidence 122, and an s-polarized component that is orthogonal to the plane of incidence 122. The p-polarized light of ray 120 will be reflected by the reflective film with a reflectivity of $R_{pp-y}$, while the s-polarized light of ray 120 is reflected by the reflective film with a reflectivity of $R_{ss-x}$. The amount of transmission and reflection of p- and s-polarized light, for any plane of incidence, will depend on the characteristics of reflective film, as is further described herein.

$R^f_{hemi}(\lambda)$, the hemispheric reflectivity of the front reflector, may be calculated from information on the layer thickness profiles of microlayers and the other layer elements of the optical film and from the refractive index values that are associated with each of the microlayers and other layers within the film. By using a 4×4 matrix-solving software application for the optical response of a multilayer film, both the reflection and transmission spectra can be calculated from the known layer thickness profile(s) and refractive index properties for the x-axis plane of incidence and for the y-axis plane of incidence and for each of p-polarized and s-polarized incident light. From this, $R^f_{hemi}(\lambda)$ may be calculated by use of the equations listed below:

$$R^f_{hemi}(\lambda) = \left(\frac{R^{x\text{-}axis}(\lambda) + R^{y\text{-}axis}(\lambda)}{2}\right) * \left(\frac{1}{E_{norm}}\right) \quad \text{Equation 2}$$

where $$R^{x\text{-}axis}(\lambda) = \frac{1}{2}\int_0^{\pi/2} \{R_{pp-x}(\theta, \lambda) + R_{ss-x}(\theta, \lambda)\} * E(\theta)d\theta \quad \text{Equation 3}$$

$$R^{y\text{-}axis}(\lambda) = \frac{1}{2}\int_0^{\pi/2} \{R_{ss-y}(\theta, \lambda) + R_{pp-y}(\theta, \lambda)\} * E(\theta)d\theta \quad \text{Equation 4}$$

and $$E_{norm} = \int_0^{\pi/2} E(\theta)d\theta \quad \text{Equation 5}$$

where $E(\theta)$ is the intensity distribution.

From Equation 1, it can be seen that the characteristics of the $R^f_{hemi}(\lambda)$ spectrum strongly affects the intensity gain spectrum. In turn, the spectral form of $R^f_{hemi}(\lambda)$ depends on the form of the cavity equilibrium intensity distribution $E(\theta)$, and its product with the spectral characteristics of the front reflector; $R_{pp-x}(\theta,\lambda)$, $R_{ss-x}(\theta,\lambda)$, $R_{pp-y}(\theta,\lambda)$ and $R_{ss-y}(\theta,\lambda)$.

For example, if the equilibrium intensity distribution $E(\theta)$, within a recycling cavity is strongly peaked to the normal ($\theta=0$), then the $R^f_{hemi}(\lambda)$ spectra will be strongly weighted by the normal angle ($\theta=0$) reflection characteristics of the front reflector. If the front reflector is configured to have narrow, higher-order harmonic reflection bands arranged across the visible spectrum, then the resulting $R^f_{hemi}(\lambda)$ spectra will have a similar, sharp reflection-band characteristics.

On the other hand, if the equilibrium intensity distribution $E(\theta)$, within a recycling cavity is broadly distributed across a wide range of angles, then the resulting $R^f_{hemi}(\lambda)$ spectra will be strongly weighted over a wide range of incidence angles. Such a broad-angle weighting of front surface reflection characteristics will tend to "smear" out any spectral reflection characteristics. If, as discussed above, the front reflector is configured to have narrow, higher-order harmonic reflection bands arranged across the visible, as discussed above, then the resulting $R^f_{hemi}(\lambda)$ spectra will no longer have the sharp reflection band characteristics of the front reflector.

For either case discussed above, the Intensity Gain spectrum will be driven by the rise and fall of $R^f_{hemi}(\lambda)$ across the visible wavelength band, and simultaneously, by the fall and rise of $T^{pol}(\theta,\varphi,\lambda)$ across the visible wavelength band.

Commercialized LCD backlights for display applications are engineered for a range light management configurations, ranging from wide-angle field of view for multi-viewer applications such a TVs, to relatively narrow fields of view for applications like monitors, laptops, tablets and smart phones. Typically, narrow field of view applications employ two or more prismatic or otherwise collimating films and as a result have an equilibrium cavity intensity distribution $E(\theta)$ that is strongly peaked towards the normal.

Figure 9:
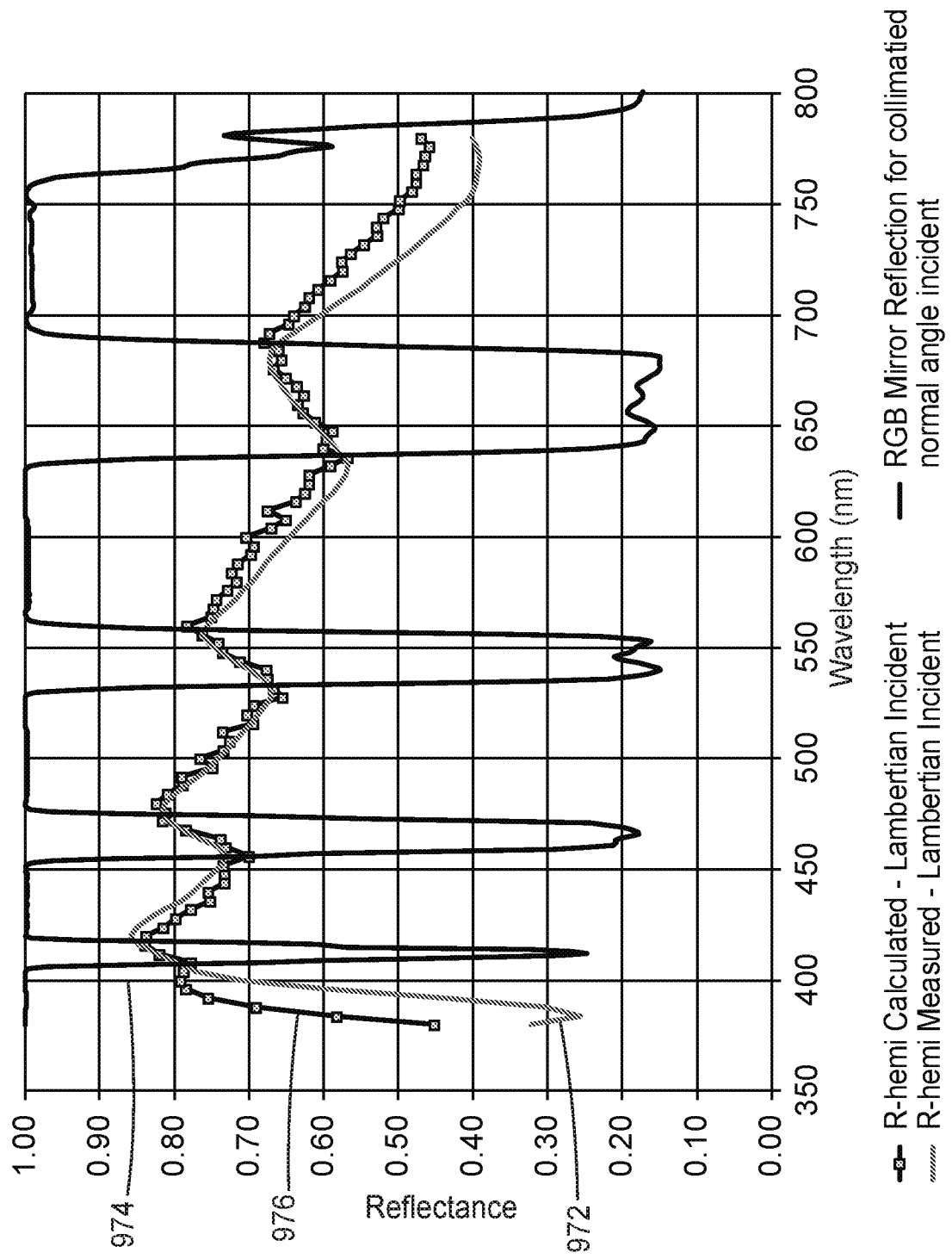
FIG. 9 is a graph of reflectance versus wavelength for a reflective optical film.

FIG. 9 shows the measured $R^f_{hemi}(\lambda)$ spectra 972 for a partial reflector film that is configured with an array of higher order harmonic reflection bands in the visible—a red, green, blue (RGB) mirror. The normal angle reflection spectrum 974 (from the measured transmission spectra) for this RGB Mirror is also shown in FIG. 9. Curve 976 is the result of a calculation of $R^f_{hemi}$ using Equations 2 through 5, where $R_{pp-x}(\theta,\lambda)$, $R_{ss-x}(\theta,\lambda)$, $R_{pp-y}(\theta,\lambda)$, and $R_{ss-y}(\theta,\lambda)$ were calculated from thicknesses determined using Atomic Force Microscopy (AFM) and refractive index analysis of the RGB mirror sample, and $E(\theta)$ was taken as a Lambertion intensity distribution. The very wide-angle Lambertian intensity distribution acts to "smear" the reflection band features for the measured and calculated $R^f_{hemi}(\lambda)$ spectra. The agreement between the measured and calculated $R^f_{hemi}(\lambda)$ spectra indicates that Equations 2 through 5 can be used to reliably determine $R^f_{hemi}(\lambda)$.

Figure 10:
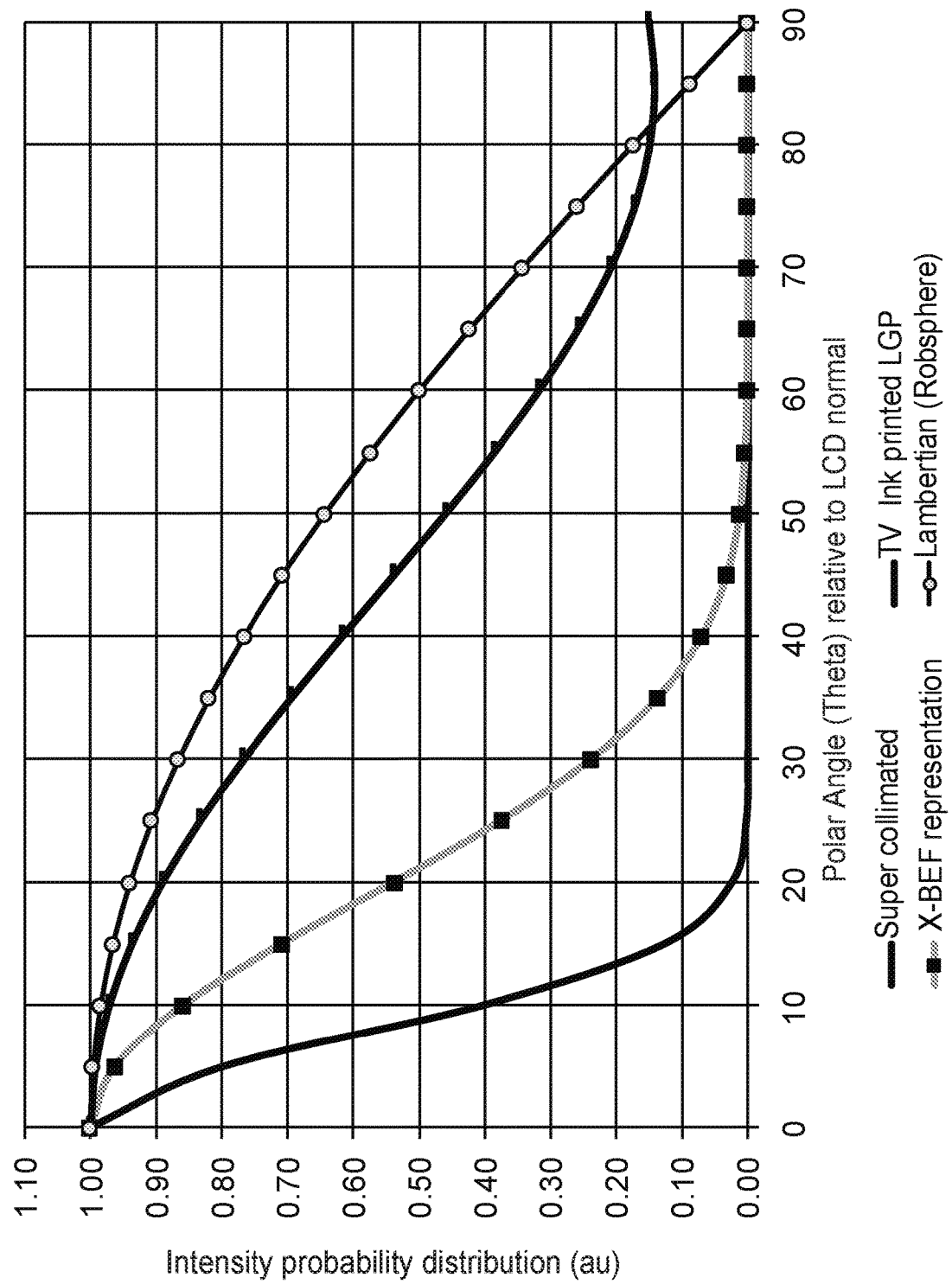
FIG. 10 is a graph of intensity distribution in a recycling backlight versus polar angle.

FIG. 10 plots a variety of possible cavity intensity distributions $E(\theta)$ that may occur in a recycling backlight cavity. The more narrow distribution examples are representative of recycling cavity intensity distributions that are formed when prismatic refractive films (e.g., crossed BEF films) or films with other collimating surface structures are arranged within the recycling cavity. The curves include intensity distributions for the Lambertian case, for a conventional TV with a backlight having a printed light guide plate, for a backlight utilizing crossed BEF films, and for a "super-collimated" backlight which is a hypothetical backlight even more collimated than the a Low Etendue Anamorphic (LEA) backlight. The intensity distributions $E(\theta)$ shown in FIG. 10 were used to calculate the $R^f_{hemi}(\lambda)$ spectra using Equations 2 through 5, where $R_{pp-x}(\theta,\lambda)$, $R_{ss-x}(\theta,\lambda)$, $R_{pp-y}(\theta,\lambda)$, and $R_{ss-y}(\theta,\lambda)$ were calculated from layer thickness determined using AFM and refractive index analysis of the RGB mirror sample. The resulting spectra show a wide range of outcomes which are provided in FIG. 11. It can be seen from FIG. 11, that broad-angle probability distributions, such as those found in a wide view-angle LCD such as a TV or a Lambertian distribution, substantially smear the reflection bands across the visible, while tighter angle distributions, such as a backlight with crossed BEF films, maintain a large degree of reflection band features. The $R^f_{hemi}(\lambda)$ spectra that results from using the "super-collimated" intensity distribution, shows that $R^f_{hemi}(\lambda)$ returns to the measured normal angle reflection spectra characteristic when the intensity distribution narrows towards the normal.

Figure 11:
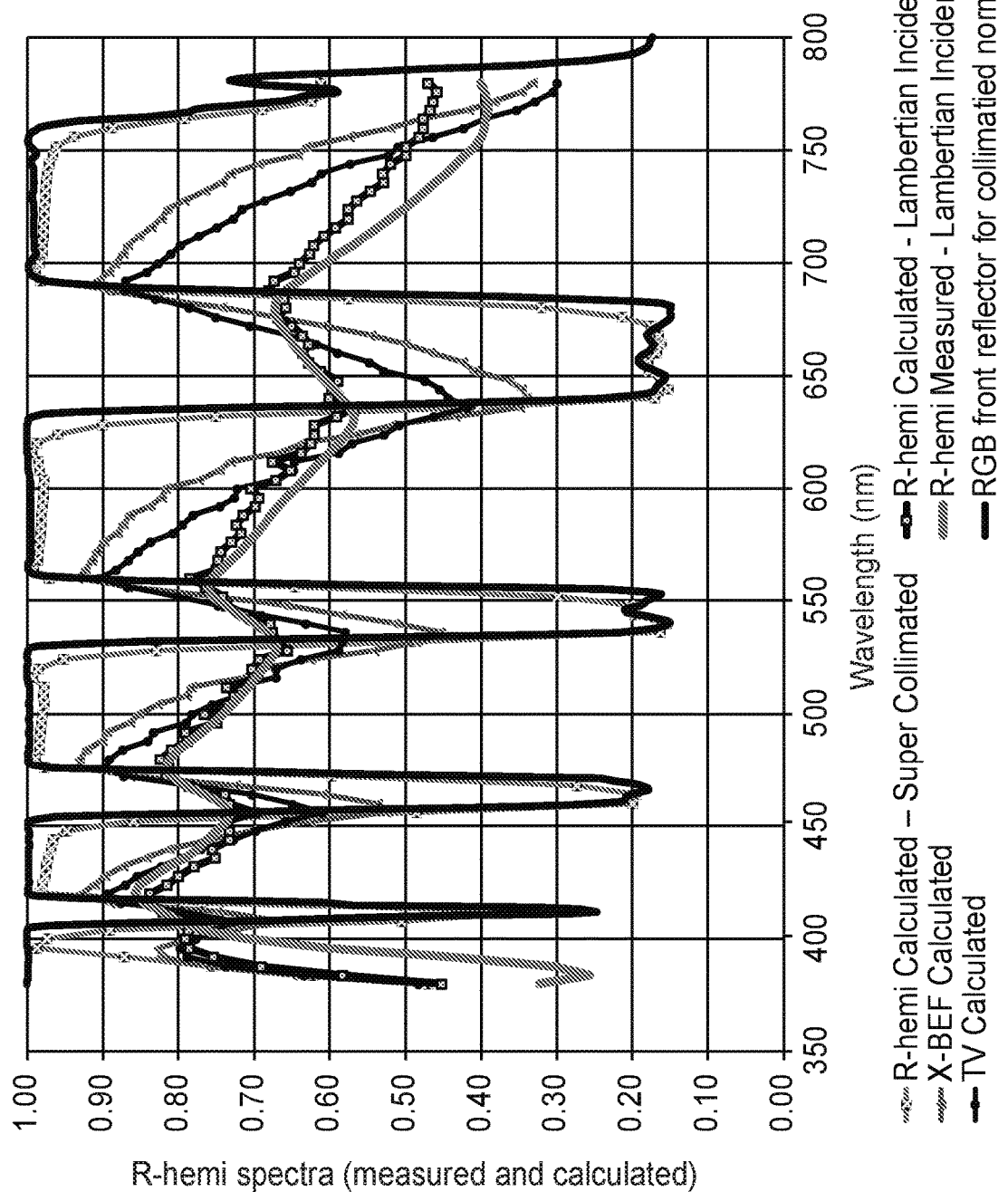
FIG. 11 is a graph of hemispheric reflectance of an optical film versus wavelength.

If the front reflector is configured as a higher-order harmonic reflective polarizer, where the reflection bands are for the polarization state that is aligned with the absorbing axis of the bottom LCD absorbing polarizer, then the $R^f_{hemi}(\lambda)$ spectra curves shown in FIG. 11 will operate as the $R^f_{hemi}(\lambda)$ component in the denominator of the intensity gain formula (Equation 1). If the backlight's recycling cavity equilibrium intensity distribution is narrow (peaked tightly around the normal) then the intensity gain spectra can have strong spectral selectivity: regions of the visible wavelength range where intensity gain is relatively high (since $R^f_{hemi}(\lambda)$ is high) and adjacent wavelength regions where intensity gain is relatively low (since $R^f_{hemi}(\lambda)$ is low). Further, if the front reflector has a relatively smooth transmission spectra for the polarization of light that is aligned with the pass-axis of the LCD's bottom absorbing polarizer, then the wavelength dependence of the intensity gain spectra will remain relatively constant over the entire range of desired viewer angles. In some cases, this can be an important consideration since it is often desirable for LCD display color saturation to be enhanced in a way that does not produce view-angle artifacts of color change with viewer orientation relative to the LCD normal.

Figure 12:
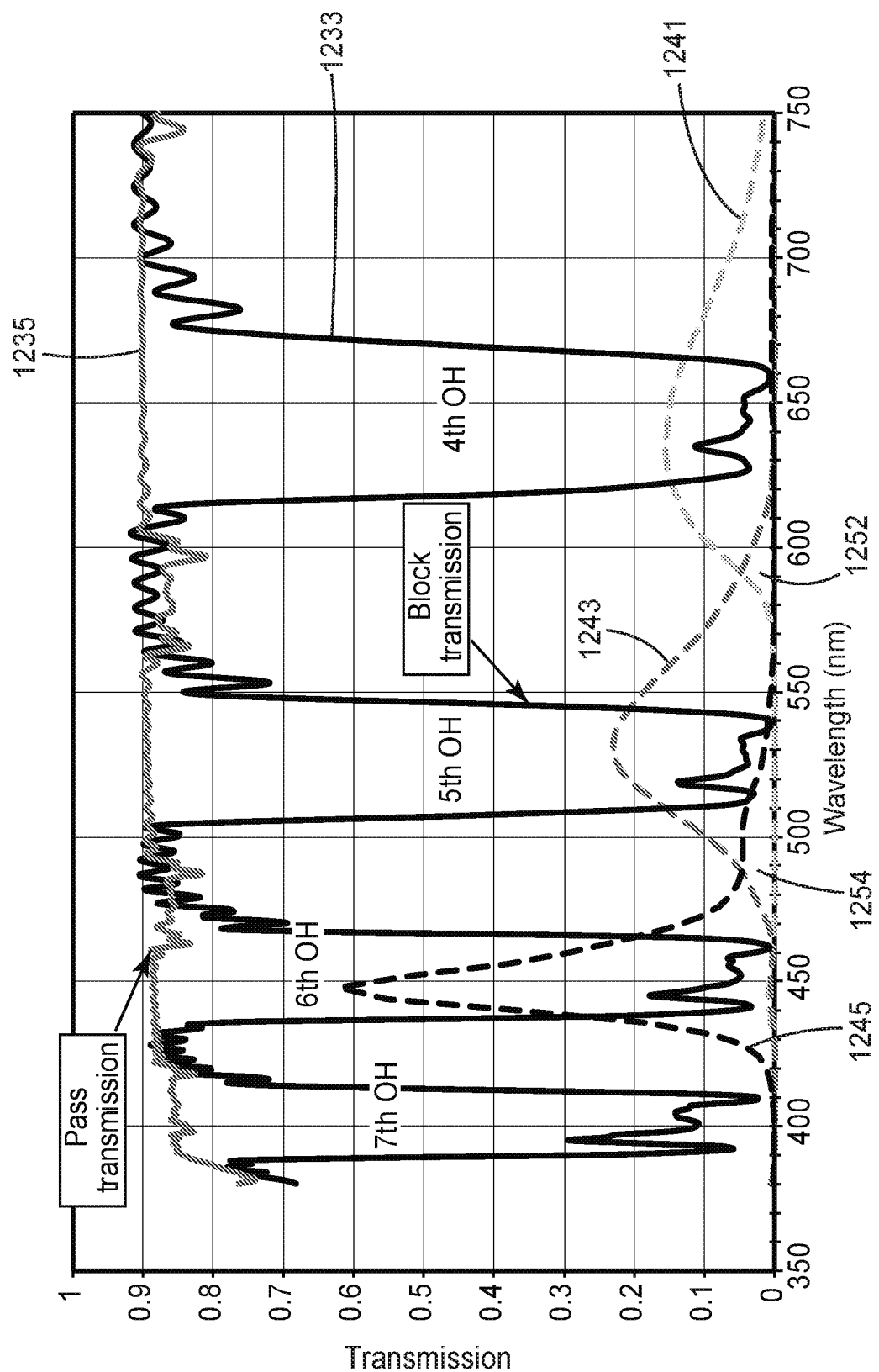
FIG. 12 is a graph of the transmission coefficient of an optical film versus wavelength.

The normal angle transmission spectra for an example front reflector film are shown in FIG. 12. The pass state and block state spectra in FIG. 12 were computed from 4×4 matrix-solving software. The dispersive, biaxial refractive index sets for the two materials used in the calculation are based on standard-tenter drawn PEN, coextruded with amorphous 75/25/HD coPEN (copolymer made with 75 mol % a methyl ester of 2,6-naphthalenedicarobxylic acid and 25 mol % dimethyl terephthalate and a diol of 95 mol % ethylene glycol and 5 mol % hexane diol). The layer profile used for the calculation, which is illustrated in FIG. 3B, is that of a 69 unit cell feedblock with a single packet block factor of about 1.09. The unit cells were configured to have an f-ratio of 0.92. The thickness of the film with typical skins and PBLs would be about 2.3 mils (60 micrometers).

The overall thickness of the reflective polarizer, combined with the f-ratio setting of 0.92, placed the higher-order harmonic reflection bands across the visible wavelength region. As can be seen in FIG. 12, the $4^{th}$, $5^{th}$ and $6^{th}$ order bands are entirely within the wavelength range of 400 to 700 nm, while a portion of the $7^{th}$ order band is within this wavelength range. Also shown in FIG. 12 are the intensity spectra 1241, 1243, and 1245 for illumination from an R-G Phosphor display LED (e.g. SEMCO 6046) transmitted thorough red, green and blue LCD color filters, respectively. In this case, the color filters were modeled after measurements made on color filters found in an SEC 46 inch (about 117 cm) LCD TV LN4081. The intensity spectra 1241, 1243, and 1245 through red, green and blue color filters, respectively, define first, second and third wavelength ranges (e.g., ranges where the intensity is greater than 5 percent or greater than 10 percent of the maximum for the respective filtered spectra). For example, spectra 1241 defines a wavelength range from about 580 nm to about 750 nm; spectra 1243 defines a wavelength range from about 480 nm to about 610 nm; and spectra 1245 defines a wavelength range from about 420 nm to about 520 nm. The first, second and third wavelength ranges define first and second overlap ranges 1252 and 1254. Overlap range 1552 is from about 580 nm to about 610 nm and overlap range 1254 is from about 480 nm to about 520 nm. For the purpose of color saturation enhancement through recycling, the reflective polarizer reflection bands were designed to lie over wavelength regions that contribute to color saturation and to be absent in wavelength regions that contribute to color desaturation. In other words, the optical film was designed such that the visible reflection bands of the optical film did not include wavelengths in the first and second overlap ranges 1252 and 1254. In some embodiments, the first and second spectra 1241 and 1243 cross at a wavelength (about 590 nm in FIG. 12) where the normal incidence block state transmission through the optical film is at least 70 percent; and the second and third spectra 1243 and 1245 cross at a wavelength (about 490 nm in FIG. 12) where the normal incidence block state transmission through the optical film is at least 70 percent.

Figure 13:
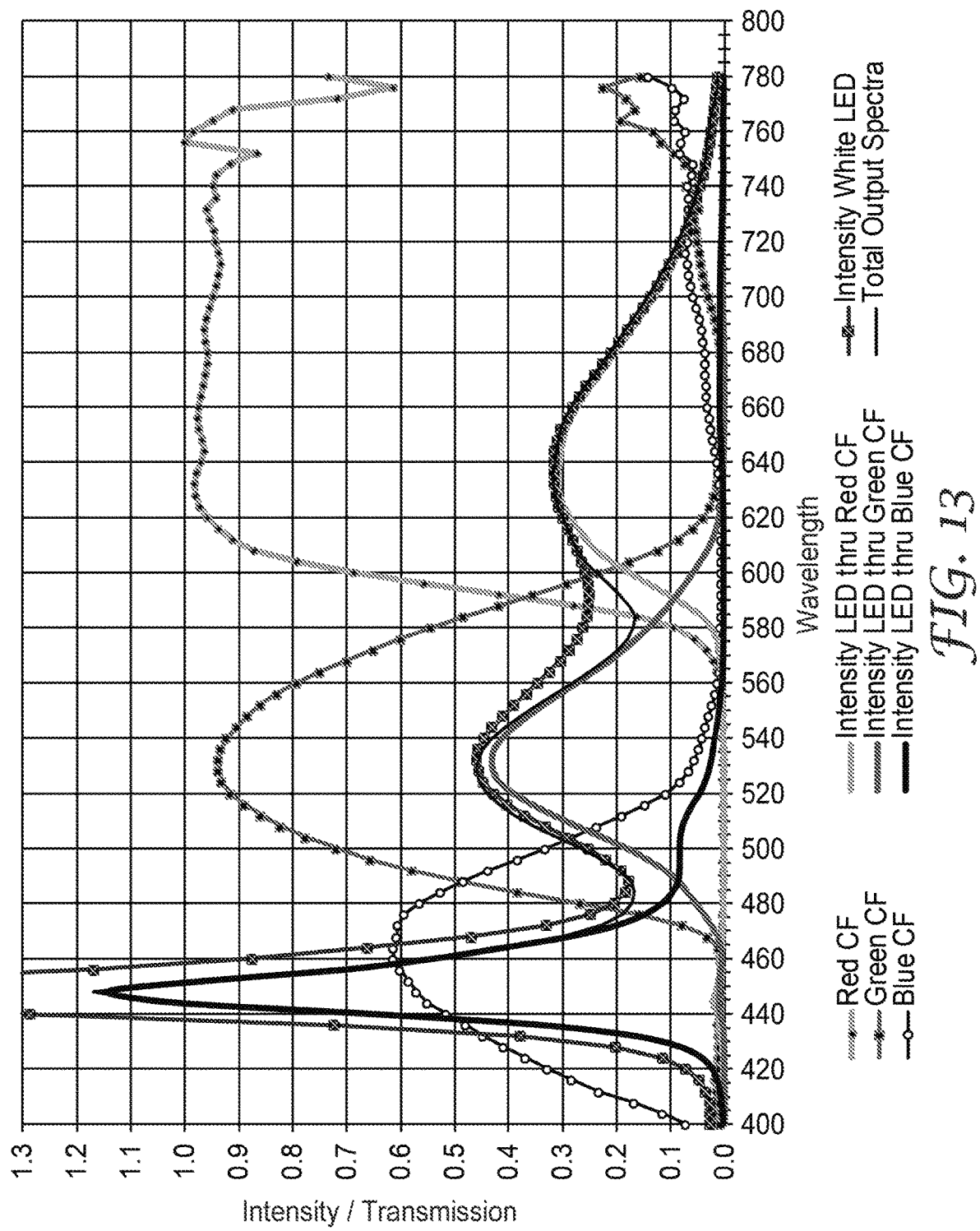
FIG. 13 illustrates the intensity and transmission spectra for a white light transmitted through color filters.
Figure 14A:
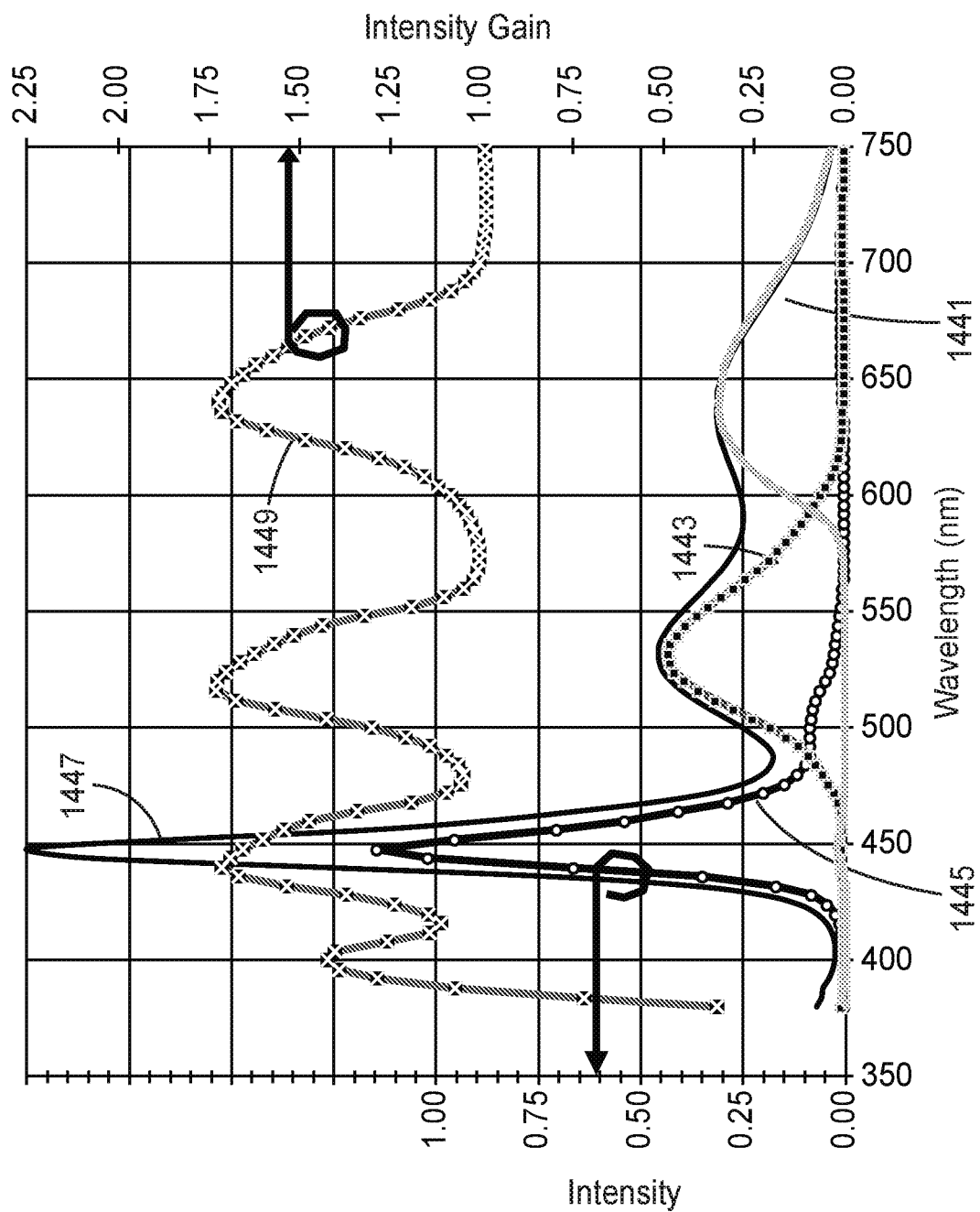
FIG. 14A illustrates the intensity spectra for a white light transmitted through color filters and the intensity gain provided by an optical film when used in a recycling backlight.
Figure 14B:
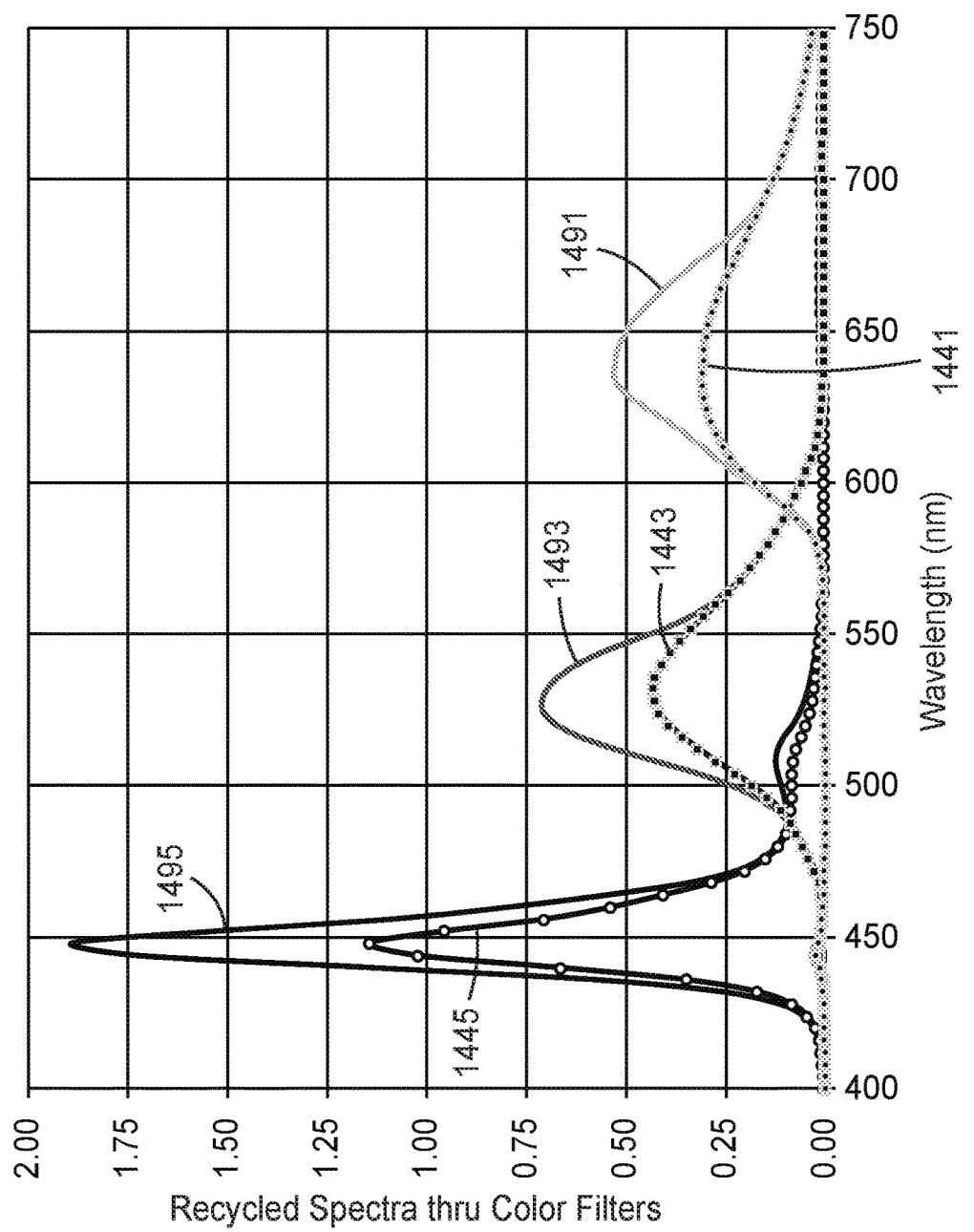
FIG. 14B illustrates the intensity spectra from a recycling backlight when an optical film is used as a front reflector.

A detailed view of the intensity and transmission spectra for a white display LED (SEMCO 6046 which is a R-G phosphor) transmitting through color filters from the SEC 46 inch LCD TV LN4081, is shown in FIG. 13. For this set of color filters, and for all of the color filters described elsewhere herein unless indicated to the contrary, the transmission levels of each filter in the blue-green-red set, is normalized to a level 95% transmission for the red filter at 630 nm. By employing Equations 1 through 5, along with intensity spectrum input (LED intensity spectra) and spectral filtering by color filters of the LCD-usable intensity spectrum through the top of the recycling cavity (the LCD panel white state light), the relative brightness increase or decrease and the color gamut increase or decrease that occurs when a front reflector is used in a recycling cavity can be calculated. An example of this computational assessment for the front reflector film of FIG. 12 and the input white LED spectrum and LCD panel color filter set of FIG. 13 is shown in FIGS. 14A-14B. In this example, the recycling cavity back reflector was taken to be a near-specular silver reflector with a visible average reflectivity of 97%. FIG. 14A shows the intensity spectrum 1447 of the white LED and the intensity spectra 1441, 1445 and 1443 after light from the white LED is passed through the red, green and blue color filters, respectively. The intensity gain 1449 determined from Equation 1 is also shown in FIG. 14A. The resulting red, green and blue intensity spectra 1491, 1493 and 1495, respectively, of the recycling backlight is shown in FIG. 14B. These curves can be obtained as the product of the intensity gain 1449 and the intensity spectra 1441, 1445 and 1443.

Figure 15:
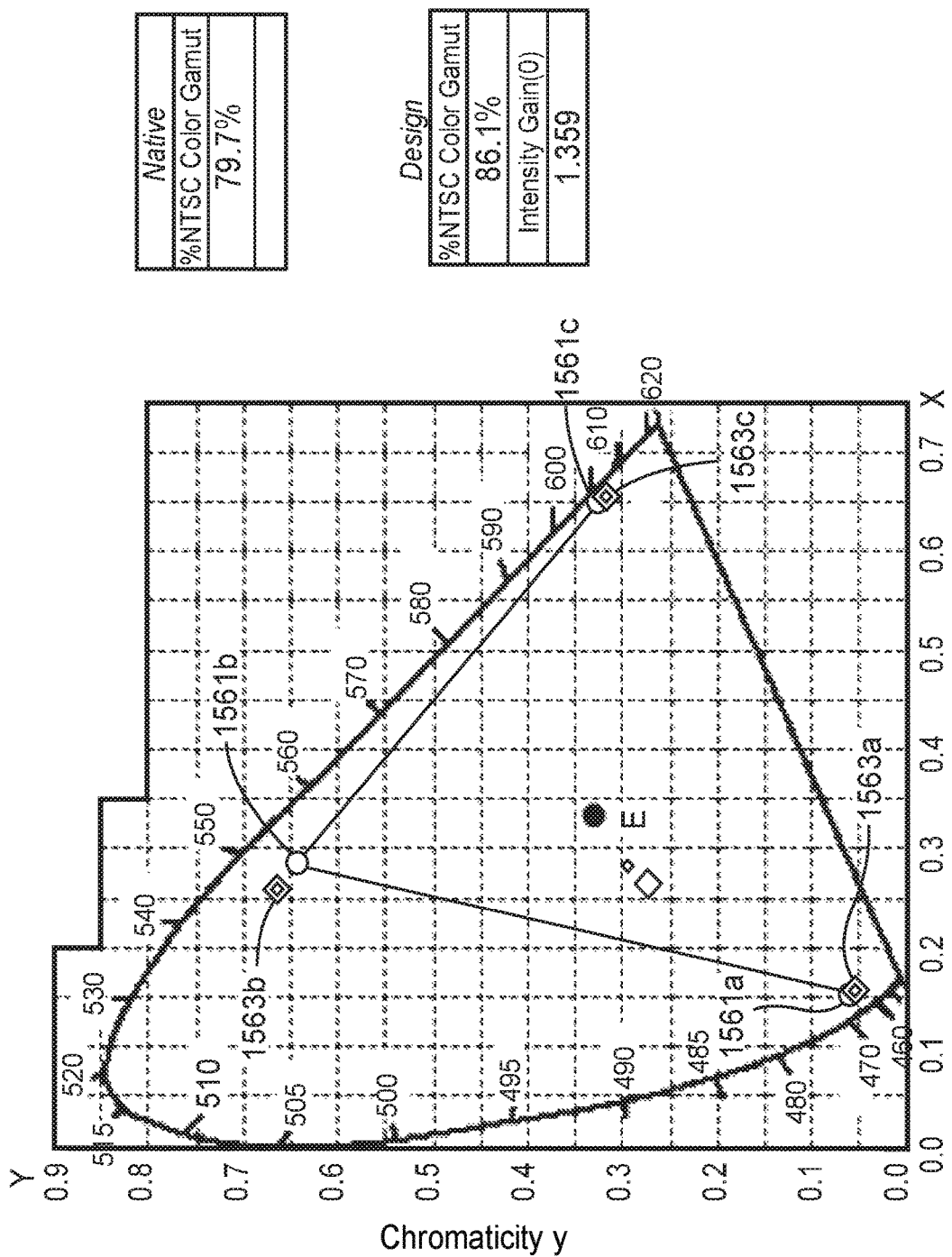
FIG. 15 is a chromaticity diagram utilizing CIE x-y chromaticity coordinates.

The resulting color gamut is shown in FIG. 15 using CIE x-y chromaticity coordinates with wavelengths in nm labeled on the plot. The chromaticity coordinates of a reference display utilizing a wide-band reflective polarizer (DBEF) in place of the optical film of the present description is indicated by the points 1561*a*, 1561*b* and 1561*c*. The corresponding chromaticity coordinates of the color gamut enhanced display utilizing the optical film described in FIGS. 12-14B are indicated by the points 1563*a*, 1563*b* and 1563*c*. The color gamut of the enhanced display was 86.1% NTSC, while that of the reference display was 79.7% NTSC. The difference between the enhanced color gamut and the reference color gamut was therefore 6.4% NTSC. The overall intensity gain was 1.359.

The following is a list of exemplary embodiments of the present description.

Embodiment 1 is an optical film having distinct first, second and third reflection bands; the first, second and third reflection bands each being visible reflection bands at normal incidence for at least one polarization state; at least two of the first, second and third reflection bands being third order or higher order harmonics; the optical film comprising alternating polymeric layers.

Embodiment 2 is the optical film of Embodiment 1, wherein each of the first, second and third reflection bands are third order or higher order harmonics.

Embodiment 3 is the optical film of Embodiment 1, wherein the first, second and third reflection bands are fourth, fifth and sixth order harmonics, respectively, of a single first order band.

Embodiment 4 is the optical film of Embodiment 1, wherein the first, second and third reflection bands are fifth, sixth and seventh order harmonics, respectively, of a single first order band.

Embodiment 5 is the optical film of Embodiment 1, wherein one of the first, second and third reflection bands is a third order harmonic of a first order band and a different one of the first, second and third reflection bands is a third order harmonic of a different first order band.

Embodiment 6 is the optical film of Embodiment 1, wherein each of the first, second and third reflection bands are third order harmonics of different first order bands.

Embodiment 7 is the optical film of Embodiment 1, wherein the first, second and third reflection bands are red, green and blue reflection bands, respectively.

Embodiment 8 is the optical film of Embodiment 1, wherein the first, second and third reflection bands are visible reflection bands at normal incidence for a first polarization state and the optical film is substantially transmissive at normal incidence for an orthogonal second polarization state.

Embodiment 9 is the optical film of Embodiment 1, wherein one of the first, second and third reflection bands results from a first stack of optical repeat units and a different one of the first, second and third reflection bands arise from a different second stack of optical repeat units.

Embodiment 10 is the optical film of Embodiment 1, wherein the first, second and third reflection bands results from different first, second and third stacks of optical repeat units.

Embodiment 11 is the optical film of Embodiment 1, wherein the first, second and third reflection band each result from a single stack of optical repeat units configured to provide a single first order band, each optical repeat unit including a first polymer layer and a different second polymer layer, each of the first second and third reflection bands being harmonics of at least fourth order of the single first order band.

Embodiment 12 is the optical film of Embodiment 11, wherein the optical repeat units have an optical thickness that varies substantially continuously from a first side of the single stack to an opposing second side of the single stack.

Embodiment 13 is the optical film of Embodiment 12, wherein the optical thickness of the optical repeat units varies between a minimum value and a maximum value, the maximum value minus the minimum value being no more than 20 percent of the maximum value.

Embodiment 14 is the optical film of Embodiment 12, wherein the optical thickness monotonically increases from a first side of the single stack to an opposing second side of the single stack.

Embodiment 15 is the optical film of Embodiment 12, wherein the optical thickness monotonically decreases from the first side of the single stack to a first optical repeat unit within the single stack, monotonically increases from the first optical repeat unit to a second optical repeat unit within the single stack disposed between the second side of the single stack and the first optical repeat unit, and monotonically decreases from the second optical repeat unit to the second side of the single stack.

Embodiment 16 is the optical film of Embodiment 15, wherein a separation between the first and second optical repeat units is at least half of a thickness of the single stack.

Embodiment 17 is the optical film of Embodiment 1, wherein at least one of the first, second and third reflection bands has a bandwidth of 50 nm or less.

Embodiment 18 is the optical film of Embodiment 1, wherein the optical film comprises no more than 15% by volume of a strain-hardening material.

Embodiment 19 is the optical film of Embodiment 1, wherein the optical film comprises no more than 10% by volume of a strain-hardening material.

Embodiment 20 is the optical film of Embodiment 1 having an f-ratio less than 0.15 or greater than 0.85.

Embodiment 21 is the optical film of Embodiment 1 having an f-ratio less than 0.10 or greater than 0.90.

Embodiment 22 is a display comprising a display panel, a backlight reflector and the optical film of any of Embodiments 1 to 21 disposed between the display panel and the backlight reflector, the optical film being a reflective polarizer.

Embodiment 23 is the display of Embodiment 22, wherein the display panel comprises a plurality of color filters adapted to transmit light in different first, second and third wavelength ranges; the first, second and third wavelength ranges defining first and second overlap ranges; the first, second and third reflection bands of the optical film not including wavelengths in the first and second overlap ranges.

Embodiment 24 is the display of Embodiment 22 having a first color gamut higher than a second color gamut of an otherwise equivalent reference display having a wide-band reflective polarizer in place of the optical film.

Embodiment 25 is the display of Embodiment 24, wherein a difference between the first color gamut and the second color gamut is at least 3% NTSC.

Embodiment 26 is the display of Embodiment 24, wherein a difference between the first color gamut and the second color gamut is at least 5% NTSC.

Descriptions for elements in figures should be understood to apply equally to corresponding elements in other figures, unless indicated otherwise. Although specific embodiments have been illustrated and described herein, it will be appreciated by those of ordinary skill in the art that a variety of alternate and/or equivalent implementations can be substituted for the specific embodiments shown and described without departing from the scope of the present disclosure. This application is intended to cover any adaptations or variations of the specific embodiments discussed herein. Therefore, it is intended that this disclosure be limited only by the claims and the equivalents thereof.

What is claimed is:

1. An optical film having distinct first, second and third reflection bands; the first, second and third reflection bands each being visible reflection bands at normal incidence for at least one polarization state; each of the first, second and third reflection bands comprising a confined region of increased reflectivity on a plot of reflectivity versus wavelength, such that the reflectivity achieves a value of at least 80% within the confined region and the reflectivity is less than 50% in adjacent wavelength ranges on opposite sides of the confined region; at least two of the first, second and third reflection bands being third order or higher order harmonics; the optical film comprising alternating polymeric layers.

2. The optical film of claim 1, wherein each of the first, second and third reflection bands are third order or higher order harmonics.

3. The optical film of claim 1, wherein the first, second and third reflection bands are fourth, fifth and sixth order harmonics, respectively, of a single first order band.

4. The optical film of claim 1, wherein the first, second and third reflection bands are fifth, sixth and seventh order harmonics, respectively, of a single first order band.

5. The optical film of claim 1, wherein one of the first, second and third reflection bands is a third order harmonic of a first order band and a different one of the first, second and third reflection bands is a third order harmonic of a different first order band.

6. The optical film of claim 1, wherein each of the first, second and third reflection bands are third order harmonics of different first order bands.

7. The optical film of claim 1, wherein the first, second and third reflection bands are red, green and blue reflection bands, respectively.

8. The optical film of claim 1, wherein the first, second and third reflection bands are visible reflection bands at normal incidence for a first polarization state and the optical film is substantially transmissive at normal incidence for an orthogonal second polarization state.

9. The optical film of claim 1, wherein one of the first, second and third reflection bands results from a first stack of optical repeat units and a different one of the first, second and third reflection bands arise from a different second stack of optical repeat units.

10. The optical film of claim 1, wherein the first, second and third reflection bands results from different first, second and third stacks of optical repeat units.

11. The optical film of claim 1, wherein the first, second and third reflection band each result from a single stack of optical repeat units configured to provide a single first order band, each optical repeat unit including a first polymer layer and a different second polymer layer, each of the first second and third reflection bands being harmonics of at least fourth order of the single first order band.

12. The optical film of claim 11, wherein the optical repeat units have an optical thickness that varies substantially continuously from a first side of the single stack to an opposing second side of the single stack.

13. The optical film of claim 12, wherein the optical thickness of the optical repeat units varies between a minimum value and a maximum value, the maximum value minus the minimum value being no more than 20 percent of the maximum value.

14. The optical film of claim 12, wherein the optical thickness monotonically increases from a first side of the single stack to an opposing second side of the single stack.

15. The optical film of claim 12, wherein the optical thickness monotonically decreases from the first side of the single stack to a first optical repeat unit within the single stack, monotonically increases from the first optical repeat unit to a second optical repeat unit within the single stack disposed between the second side of the single stack and the first optical repeat unit, and monotonically decreases from the second optical repeat unit to the second side of the single stack.

16. The optical film of claim 15, wherein a separation between the first and second optical repeat units is at least half of a thickness of the single stack.

17. The optical film of claim 1, wherein at least one of the first, second and third reflection bands has a bandwidth of 50 nm or less.

18. The optical film of claim 1, wherein the optical film comprises no more than 15% by volume of a strain-hardening material.

19. The optical film of claim 1 having an f-ratio less than 0.15 or greater than 0.85.

20. A display comprising a display panel, a backlight reflector and the optical film of claim 1 disposed between the display panel and the backlight reflector, the optical film being a reflective polarizer.

21. The display of claim 20, wherein the display panel comprises a plurality of color filters adapted to transmit light in different first, second and third wavelength ranges; the first, second and third wavelength ranges defining first and second overlap ranges; the first, second and third reflection bands of the optical film not including wavelengths in the first and second overlap ranges.

22. The display of claim 20 having a first color gamut higher than a second color gamut of an otherwise equivalent reference display having a wide-band reflective polarizer in place of the optical film.

23. The display of claim 22, wherein a difference between the first color gamut and the second color gamut is at least 3% of a National Television System Committee (NTSC) color gamut.

24. An optical film having distinct first, second and third reflection bands; the first, second and third reflection bands each being visible reflection bands at normal incidence for at least one polarization state; the optical film comprising alternating polymeric layers, wherein the first, second and third reflection bands are fourth, fifth and sixth order harmonics, respectively, of a single first order band.

25. An optical film having distinct first, second and third reflection bands; the first, second and third reflection bands each being visible reflection bands at normal incidence for at least one polarization state; the optical film comprising alternating polymeric layers, wherein one of the first, second and third reflection bands is a third order harmonic of a first order band and a different one of the first, second and third reflection bands is a third order harmonic of a different first order band.

* * * * *